US010526799B2

(12) United States Patent
Telleria et al.

(10) Patent No.: US 10,526,799 B2
(45) Date of Patent: Jan. 7, 2020

(54) AUTOMATED DRYWALL CUTTING AND HANGING SYSTEM AND METHOD

(71) Applicant: Canvas Construction, Inc., San Francisco, CA (US)

(72) Inventors: Maria J. Telleria, Redwood City, CA (US); Gabriel F. Hein, Albany, CA (US); Kevin B. Albert, San Francisco, CA (US); Thomas F. Allen, Oakland, CA (US); Jonathan B. Pompa, Long Beach, CA (US)

(73) Assignee: CANVAS CONSTRUCTION, INC., San Francisco, CA (US)

(*) Notice: Subject to any disclaimer, the term of this patent is extended or adjusted under 35 U.S.C. 154(b) by 0 days.

(21) Appl. No.: 15/942,193

(22) Filed: Mar. 30, 2018

(65) Prior Publication Data

US 2018/0283018 A1    Oct. 4, 2018

Related U.S. Application Data

(60) Provisional application No. 62/480,172, filed on Mar. 31, 2017.

(51) Int. Cl.
*E04F 21/02* (2006.01)
*E04F 21/165* (2006.01)
(Continued)

(52) U.S. Cl.
CPC .............. *E04F 21/026* (2013.01); *B05B 1/28* (2013.01); *B05B 7/0093* (2013.01); *B05B 9/007* (2013.01);
(Continued)

(58) Field of Classification Search
None
See application file for complete search history.

(56) References Cited

U.S. PATENT DOCUMENTS 2,088,542 A    7/1937   Westin
2,514,748 A    7/1950   Di Stefano
(Continued)

FOREIGN PATENT DOCUMENTS

CN    2883554 Y    3/2007
CN    202023345 U    11/2011
(Continued)

OTHER PUBLICATIONS

Krieg, "HygroSkin—Meteorosensitive Pavilion", Feb 2014, Institute for Computational Design, University of Stuttgart, Germany, pp. 63-66 (Year: 2014).*

(Continued)

*Primary Examiner* — Mohammad Ali
*Assistant Examiner* — David Earl Ogg
(74) *Attorney, Agent, or Firm* — Davis Wright Tremaine LLP

(57) ABSTRACT

An automated drywalling system for cutting and/or hanging drywall that includes one or more vision systems and a computing device executing a computational planner. The computational planner obtains target wall assembly data from the one or more vision systems, the target wall assembly data including information regarding a configuration of a target wall assembly including a plurality of studs that define a portion of the target wall assembly; and generates a plan for a configuration of a plurality of drywall pieces to be disposed on studs of the target wall assembly based on the target wall assembly data.

18 Claims, 10 Drawing Sheets

(51) Int. Cl.

| | | |
|---|---|---|
| *E04F 21/18* | (2006.01) | |
| *B25J 9/16* | (2006.01) | |
| *B26D 5/00* | (2006.01) | |
| *E04F 21/08* | (2006.01) | |
| *E04F 21/16* | (2006.01) | |
| *B24B 7/18* | (2006.01) | |
| *B24B 49/12* | (2006.01) | |
| *B24B 55/10* | (2006.01) | |
| *E04F 21/00* | (2006.01) | |
| *B25J 11/00* | (2006.01) | |
| *B05C 5/00* | (2006.01) | |
| *B05C 5/02* | (2006.01) | |
| *B05C 11/10* | (2006.01) | |
| *B05D 1/02* | (2006.01) | |
| *B05D 3/04* | (2006.01) | |
| *B05D 3/06* | (2006.01) | |
| *B24B 55/06* | (2006.01) | |
| *B25J 15/00* | (2006.01) | |
| *E04B 1/76* | (2006.01) | |
| *E04F 21/12* | (2006.01) | |
| *B05B 1/28* | (2006.01) | |
| *B05B 7/00* | (2006.01) | |
| *B05B 9/00* | (2006.01) | |
| *B05B 12/12* | (2006.01) | |
| *B05B 15/625* | (2018.01) | |
| *B25J 9/00* | (2006.01) | |
| *B26D 3/08* | (2006.01) | |
| *B05B 7/24* | (2006.01) | |
| *B05B 7/26* | (2006.01) | |
| *B05B 9/01* | (2006.01) | |
| *B05C 3/18* | (2006.01) | |
| *B05B 14/00* | (2018.01) | |

(52) U.S. Cl.
CPC .......... *B05B 12/122* (2013.01); *B05B 15/625* (2018.02); *B05C 5/004* (2013.01); *B05C 5/02* (2013.01); *B05C 11/1039* (2013.01); *B05D 1/02* (2013.01); *B05D 3/0413* (2013.01); *B05D 3/067* (2013.01); *B24B 7/182* (2013.01); *B24B 49/12* (2013.01); *B24B 55/06* (2013.01); *B24B 55/10* (2013.01); *B25J 9/1661* (2013.01); *B25J 9/1697* (2013.01); *B25J 11/0055* (2013.01); *B25J 11/0075* (2013.01); *B25J 15/0019* (2013.01); *B26D 5/007* (2013.01); *E04B 1/7654* (2013.01); *E04F 21/0046* (2013.01); *E04F 21/08* (2013.01); *E04F 21/085* (2013.01); *E04F 21/12* (2013.01); *E04F 21/16* (2013.01); *E04F 21/165* (2013.01); *E04F 21/1652* (2013.01); *E04F 21/1657* (2013.01); *E04F 21/18* (2013.01); *B05B 7/24* (2013.01); *B05B 7/26* (2013.01); *B05B 9/01* (2013.01); *B05B 14/00* (2018.02); *B05C 3/18* (2013.01); *B25J 9/0084* (2013.01); *B26D 3/085* (2013.01); *G05B 2219/40298* (2013.01); *Y10S 901/01* (2013.01); *Y10S 901/41* (2013.01); *Y10S 901/43* (2013.01); *Y10S 901/47* (2013.01)

(56) References Cited

U.S. PATENT DOCUMENTS

| | | |
|---|---|---|
| 3,116,882 A | 1/1964 | Vork |
| 4,941,182 A | 7/1990 | Patel |
| 5,175,018 A | 12/1992 | Lee et al. |
| 5,279,700 A | 1/1994 | Retti |
| 5,670,202 A | 9/1997 | Guzowski et al. |
| 5,979,520 A | 11/1999 | Behrendt |
| 6,112,490 A | 9/2000 | Meyer |
| 6,149,506 A | 11/2000 | Duescher |
| 6,712,238 B1 | 3/2004 | Mills |
| 7,551,058 B1 | 6/2009 | Johnson et al. |
| 9,518,870 B2 | 12/2016 | Verdino |
| 9,527,211 B2 | 12/2016 | Posselius et al. |
| 9,694,381 B2 | 7/2017 | Mohr |
| 9,702,830 B1* | 7/2017 | Akselrod ........... G06K 9/00671 |
| 9,849,594 B2* | 12/2017 | Keese ................ B25J 11/006 |
| 9,995,047 B2* | 6/2018 | Raman ................ E04F 21/1872 |
| 2004/0159724 A1 | 8/2004 | van der Steur |
| 2005/0120840 A1* | 6/2005 | Koskovich ........... B23D 59/001 |
| | | 83/13 |
| 2006/0108450 A1 | 5/2006 | Klinkenberg et al. |
| 2007/0000947 A1 | 1/2007 | Lewis et al. |
| 2007/0107632 A1 | 5/2007 | Ball |
| 2007/0151201 A1 | 7/2007 | Fellinger |
| 2009/0199690 A1* | 8/2009 | Sun ..................... B25J 9/1664 |
| | | 83/523 |
| 2010/0010660 A1* | 1/2010 | Salour .................. G05B 19/402 |
| | | 700/117 |
| 2011/0011222 A1* | 1/2011 | Bales ..................... B23K 31/02 |
| | | 83/13 |
| 2011/0211938 A1* | 9/2011 | Eakins .................. B25J 9/1687 |
| | | 414/738 |
| 2011/0253291 A1 | 10/2011 | Allen et al. |
| 2012/0219699 A1 | 8/2012 | Pettersson et al. |
| 2013/0167471 A1 | 7/2013 | Denaro |
| 2014/0022281 A1* | 1/2014 | Georgeson ............ G06F 3/1454 |
| | | 345/633 |
| 2014/0230726 A1 | 8/2014 | Gale et al. |
| 2015/0112482 A1 | 4/2015 | Kuwahara |
| 2015/0147460 A1 | 5/2015 | Manzi et al. |
| 2015/0336267 A1* | 11/2015 | Sun ..................... B25J 9/163 |
| | | 700/161 |
| 2015/0350618 A1* | 12/2015 | Meier .................. H04N 9/3185 |
| | | 345/7 |
| 2016/0052012 A1 | 2/2016 | Mohr |
| 2016/0121486 A1 | 5/2016 | Lipinski et al. |
| 2016/0313294 A1 | 10/2016 | Dattilo et al. |
| 2017/0052507 A1* | 2/2017 | Poulos .................. G06T 19/006 |
| 2018/0009000 A1* | 1/2018 | Shang .................. H04N 13/204 |
| 2018/0021799 A1 | 1/2018 | Raman et al. |
| 2019/0118209 A1 | 4/2019 | Rennuit |

FOREIGN PATENT DOCUMENTS

| | | |
|---|---|---|
| CN | 105971253 A | 9/2016 |
| CN | 106088544 A | 11/2016 |
| DE | 102006056179 A1 | 6/2008 |
| JP | H03100265 A | 4/1991 |
| JP | H04169659 A | 6/1992 |
| JP | H10180178 A | 7/1998 |
| RU | 1789711 C | 1/1993 |
| RU | 2100686 C1 | 12/1997 |
| SU | 00160667 | 11/1963 |
| WO | 2013000524 A1 | 1/2013 |
| WO | 2016200439 A1 | 12/2016 |

OTHER PUBLICATIONS

International Search Report and Written Opinion dated Aug. 2, 2018, International Patent Application No. PCT/US2018/025570, filed Mar. 30, 2018, 7 pages.

International Search Report and Written Opinion dated Jul. 5, 2018, International Patent Application No. PCT/US2018/025529, filed Mar. 30, 2018, 7 pages.

International Search Report and Written Opinion dated Jul. 5, 2018, International Patent Application No. PCT/US2018/025536, filed Mar. 30, 2018, 7 pages.

International Search Report and Written Opinion dated Jul. 5, 2018, International Patent Application No. PCT/US2018/025553, filed Mar. 30, 2018, 7 pages.

International Search Report and Written Opinion dated Jul. 5, 2018, International Patent Application No. PCT/US2018/025556, filed Mar. 30, 2018, 7 pages.

(56) References Cited

OTHER PUBLICATIONS

International Search Report and Written Opinion dated Jul. 5, 2018, International Patent Application No. PCT/US2018/025566, filed Mar. 30, 2018, 7 pages.
International Search Report and Written Opinion dated Feb. 28, 2019, International Patent Application No. PCT/US2018/052751, filed Sep. 25, 2018, 7 pages.
Bao et al., "Flexible Pneumatic End-effector for Agricultural Robot: Design & Experiment," Proceedings of the 2015 IEEE Conference on Robotics and Biomimetics, Dec. 6, 2015, 6 pages.
FANUC America Corporation, "Robotic Sanding, Washing & Drying an Aircraft Fuselage with FANUC's New P-350iA/45 Robot," Oct. 27, 2018, retrieved from https://www.youtube.com/watch?v=abA9v8EOokI, 4 pages.
FANUC America Corporation, "Robotic Sanding, Washing & Drying an Aircraft Fuselage with FANUC's New P-350iA/45 Robot," Oct. 27, 2016, retrieved from https://www.youtube.com/watch?v=abA9v8EOokI, 4 pages.
Forsberg et al., "A Construction Robot for Autonomous Plastering of Walls and Ceilings," Jun. 11, 1997, retrieved Aug. 8, 2019, from http://www.iaarc.org/publications/fulltext/A_construction_robot_for_autonomous_plastering_of_walls_and_ceilings.PDF, 9 pages.
Tuberville Enterprizes, "Walls & Ceilings Joint Compund Additive," Jun. 5, 2012, retrieved Aug. 8, 2019, from https://www.wconline.com/articles/88003-joint-compound-additive, 1 page.
Nagata et al., "Robotic sanding system for new designed furniture with free-formed surface," Robotics and computer-Integrated Manufacturing 23(4):371-379, Aug. 2007.

\* cited by examiner

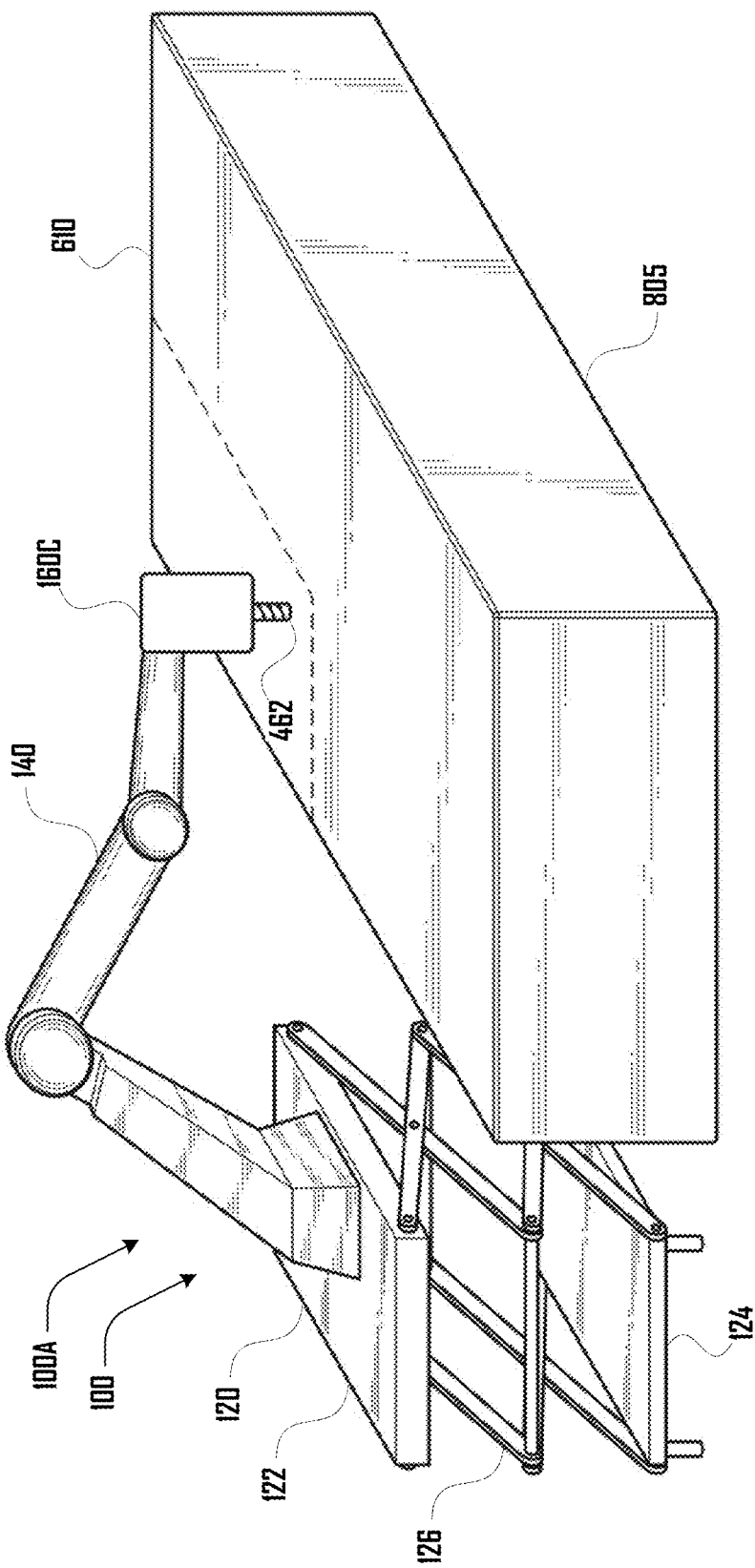

AUTOMATED DRYWALL CUTTING AND HANGING SYSTEM AND METHOD

CROSS-REFERENCE TO RELATED APPLICATIONS

This application is a non-provisional of, and claims the benefit of U.S. Provisional Application No. 62/480,172, filed Mar. 31, 2017, which application is hereby incorporated herein by reference in their entirety and for all purposes.

This application is also related to U.S. Non-provisional applications filed contemporaneously herewith having respective application Ser. Nos. 15/942,158, 15/941,886, 15/942,318, 15/942,087, 15/942,286 and 15/941,974 and respectively entitled "AUTOMATED DRYWALL PLANNING SYSTEM AND METHOD," "AUTOMATED DRYWALL MUDDING SYSTEM AND METHOD," "AUTOMATED DRYWALL SANDING SYSTEM AND METHOD," "AUTOMATED DRYWALL PAINTING SYSTEM AND METHOD," "AUTOMATED DRYWALLING SYSTEM AND METHOD," and "AUTOMATED INSULATION APPLICATION SYSTEM AND METHOD." These applications are hereby incorporated herein by reference in their entirety and for all purposes.

BRIEF DESCRIPTION OF THE DRAWINGS

FIG. 8 illustrates an example embodiment of an automated drywalling system that includes a base unit, robotic arm, and a cutting end effector having one or more cutting tool.

Figure 1:
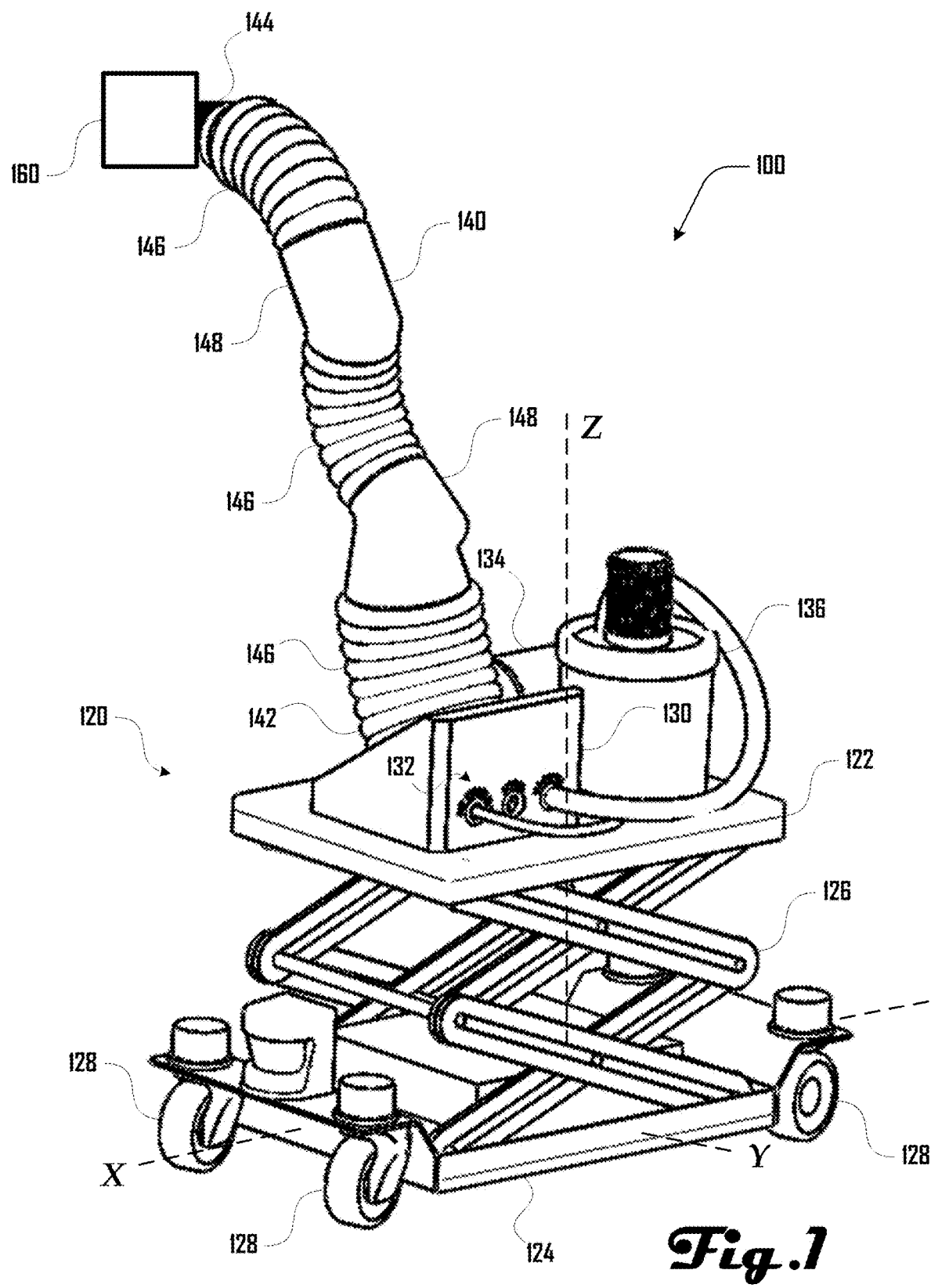
FIG. 1 is an exemplary perspective drawing illustrating an embodiment of an automated drywall installation system.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION OF THE PREFERRED EMBODIMENTS

The following disclosure pertains to an automated drywalling system, which in some embodiments can be used for drywalling, including one or more of planning a configuration and location of drywall pieces on a wall assembly, cutting drywall pieces, hanging drywall pieces, performing mud work on hung drywall pieces, performing sanding on mudded drywall pieces and painting sanded drywall pieces.

One aspect relates to an automated system and method for cutting and hanging drywall or other substrates to cover surfaces like walls or ceilings. These substrates may or may not be covered with a coating including joint compound, plaster, stucco, insulation, or paint after they have been hung or attached to the framing system. The automation system can be composed of a vision or mapping system, a planner, a marking system, a cutting system, a number of robotic manipulators, a number of mobile bases, assist tools and stands, an augmented reality system, a user interface, a system to display maps or toolpaths in 3D on a computer or projected onto the environment, an inspection system to check placement and depth of anchors with associated images, a 2D or 3D map presenting the work performed, and any combination of these components.

Figure 2:
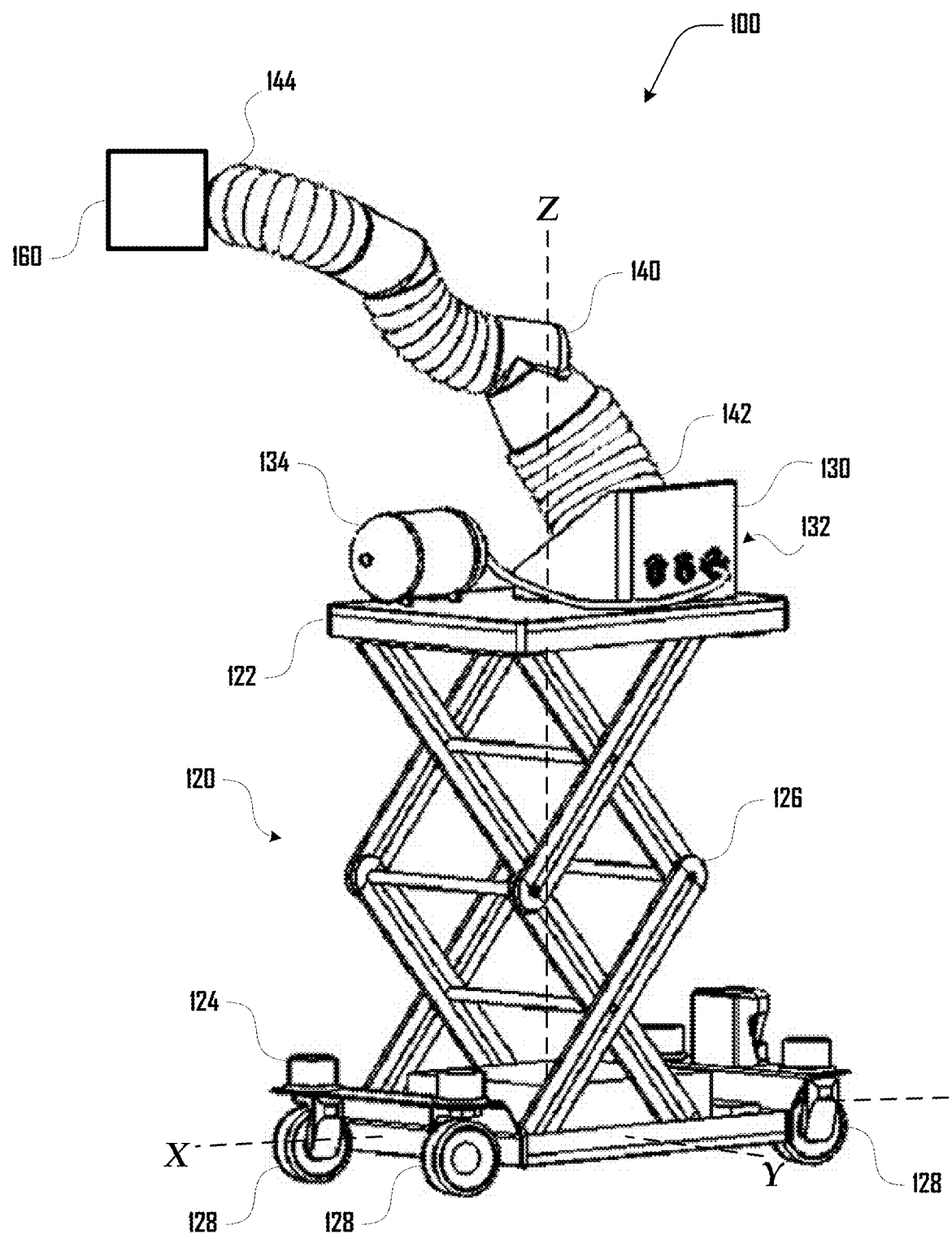
FIG. 2 is an exemplary perspective drawing illustrating another embodiment of an automated drywalling system.

Turning to FIGS. 1 and 2, examples of an automated drywalling system 100 are illustrated, which includes a base unit 120, a robotic arm 140 and an end effector 160. The base unit 120 comprises a platform 122 and a cart 124 with a lift 126 disposed between the platform 122 and cart 124. The cart 124 can be configured to be disposed on the ground and move within an XY plane defined by axes X and Y, and the lift 126 can be configured to raise the platform 122 up and down along axis Z, which is perpendicular to axes X and Y.

In the examples of FIGS. 1 and 2, the cart 124 can comprise a plurality of wheels 128, which can be used to move the cart 124 and drywalling system 100 on the ground in the XY plane. Such movement can be motorized or can be non-motorized. For example, in some embodiments, the drywalling system 100 can be configured for automated movement of the cart 124, motorized movement based on input from a user and/or non-motorized movement based on physical movement by a user. Additionally, while an example having wheels 128 is shown in some examples herein, it should be clear that the cart 124 can be configured for motorized and/or non-motorized movement via any suitable structures, systems, or the like.

In the examples of FIGS. 1 and 2, the lift 126 is shown comprising a scissor lift that can raise and lower the platform 122 relative to the cart 124 along axis Z. Such movement can be motorized or can be non-motorized. For example, in some embodiments, the drywalling system 100 can be configured for automated movement of the lift 126, motorized movement of the lift 126 based on input from a user and/or non-motorized movement based on physical operation of the lift 126 by a user. Additionally, while an example of a scissor lift is shown herein, it should be clear that any suitable lift system can comprise the lift 126 without limitation.

The platform 122 can comprise a hub 130, which can couple with the robotic arm 140 at a base end 142 of the robotic arm 140. The hub 130 can comprise an input interface 132 that allows for various systems to couple with the hub 130, which can allow for resources provided by such systems to be provided to the robotic arm 140 and/or the end effector 160 coupled at a distal end 144 of the robotic arm 140 as discussed in more detail herein. For example, a pneumatic source, a power source, a vacuum source, a paint source, a mud or joint compound source, or the like can be coupled to the hub 130. FIG. 1 illustrates an example having an air compressor 134 and a vacuum source 136 coupled to the hub 130. FIG. 2 illustrates an example having an air compressor 134 coupled to the hub 130, which can be used to power pneumatic actuators 146 of the robotic arm 140 and/or provide compressed air to the end effector 160 at the distal end 144 of the robotic arm 140.

In various embodiments, the robotic arm 140 can comprise any suitable robotic arm system, which can include pneumatic actuators, electric actuators, and the like. The robotic arm 140 can have any suitable number of degrees of freedom. Although the examples of FIGS. 1 and 2, illustrate an example having pneumatic actuator units 146 separated by arm couplers 148, this example configuration should not be construed to be limiting on the wide variety of robotic arms 140 that are within the scope and spirit of the present disclosure.

As discussed in more detail herein, an end effector 160 can be coupled at the distal end 144 of the robotic arm 140. In some examples, the automated drywalling system 100 can comprise modular and/or multi-use end effectors 160, which can be configured for various drywalling, construction, or other tasks. For example, as discussed herein, end effectors 160 can be configured for drywall planning, drywall hanging, applying mud or joint compound to hung drywall, sanding mudded drywall, painting, and the like. Although various examples herein relate to drywalling and construction, further embodiments of the drywalling system 100 can be configured for any suitable tasks, including construction tasks, manufacturing tasks, gardening tasks, farming tasks, domestic tasks, and the like. Accordingly, the discussions herein related to drywalling and construction should not be construed to be limiting on the wide variety of tasks that the system 100 can be configured for.

Figure 3:
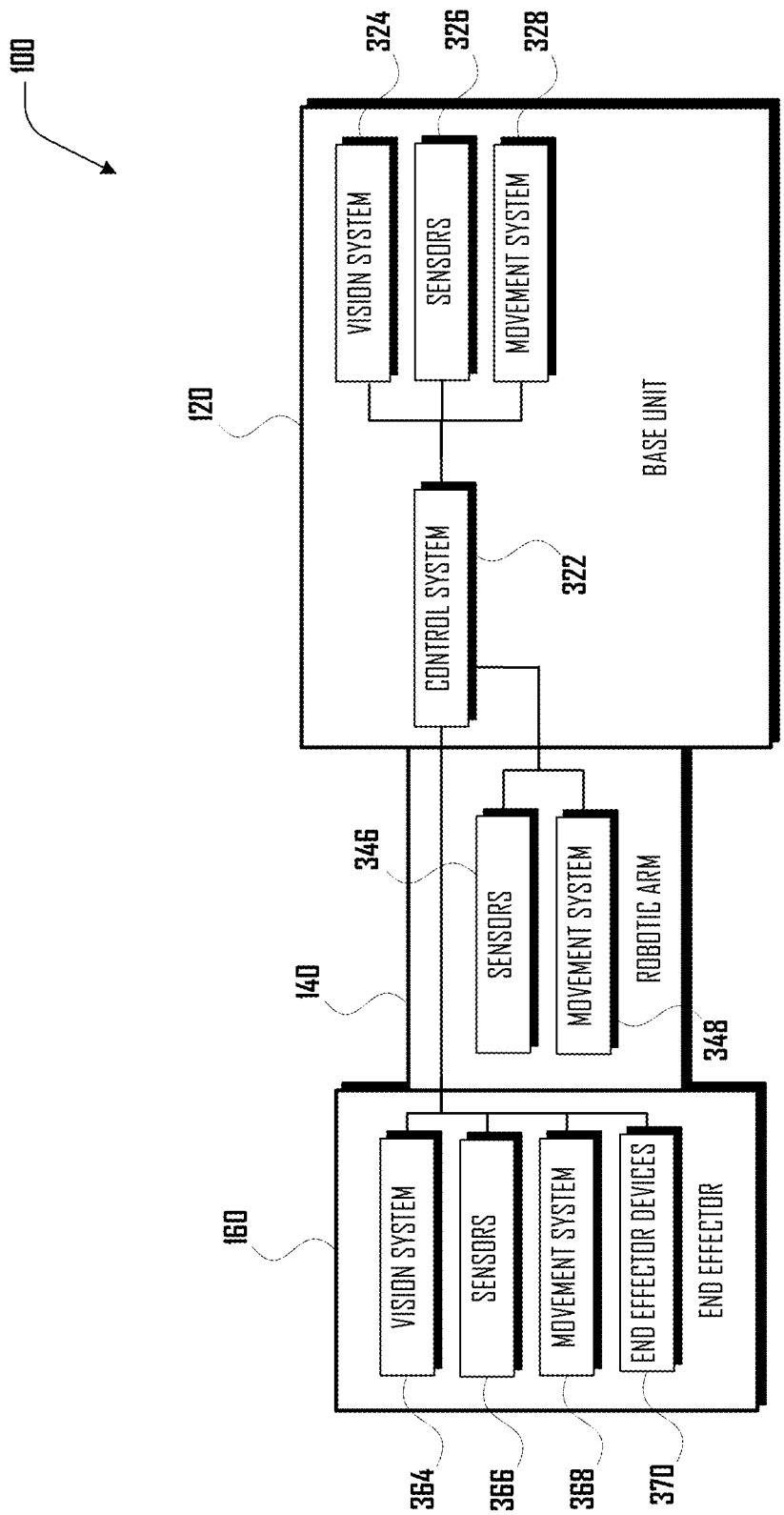
FIG. 3 is an exemplary block diagram illustrating systems of an automated drywalling system in accordance with one embodiment.

Turning to FIG. 3, a block diagram of a drywalling system 100 is illustrated, which includes a base unit 120 coupled to a robotic arm 140, which is coupled to an end effector 160. The base unit 120 is shown comprising a control system 322, which is operably coupled to a vision system 324, sensors 326, and a movement system 328. The robotic arm 140 is shown comprising sensors 346 and a movement system 348, which are operably coupled to the control system 322. The example end effector 160 is shown comprising a vision system 364, sensors 366, a movement system 368, and one or more end effector devices 370, which are operably connected to the control system 322.

In various embodiments, the connections between the control system 322 and respective vision systems 324, 364; respective sensors 326, 346, 366; respective movement systems 328, 348, 368; and end effector devices 370 can comprise any suitable type of connection including wired and/or wireless connections. For example, such connections can be configured for digital and/or analog communication of information between respective elements.

The vision systems 324, 364 can comprise one or more suitable vision system including one or more visible spectrum camera, radar, light detection and ranging (LIDAR) system, sonar, infrared camera, thermal camera, stereo cameras, structured light camera, laser scanners, and the like. The vision systems 324, 364 can comprise the same or different elements. Additionally, in some embodiments, one or both of the vision systems 324, 364 can be absent. In some embodiment, the robotic arm 140 can comprise a vision system.

The sensors 326, 346, 366 can comprise any suitable sensors in various embodiments including one or more sensors of humidity, temperature, air flow, laser curtains, proximity sensors, force and torque sensors, pressure sensors, limit switches, rotameter, spring and piston flow meter, ultrasonic flow meter, turbine meter, paddlewheel meter, variable area meter, positive displacement, vortex meter, pitot tube or differential pressure meters, magnetic meters, humidity sensor, conductivity sensor and depth or thickness sensors. The sensors 326, 346, 366 can comprise the same or different elements. Additionally, in some embodiments, one or more of the sensors 326, 346, 366 can be absent.

The movement systems 328, 348, 368 can comprise any suitable movement systems in various embodiments including one or more of an electric motor, pneumatic actuators, piezo electric actuator, and the like. For example, in some embodiments the movement system 328 of the base unit 120 can comprise the lift 126 and motors that drive wheels 128 of the cart 124 (see FIGS. 1 and 2). In another example, the movement system 348 of the robotic arm 140 can comprise pneumatic actuators 146 as illustrated in the examples of FIGS. 1 and 2. In various embodiments, the movement system 368 of the end effector 160 can comprise motors or other systems that are configured to move, change the orientation of, rotate, or otherwise configure the end effector 160. In some embodiments, one or more of the movement systems 328, 348, 368 can be absent.

As discussed herein, the one or more end effector devices 370 can comprise various suitable devices, including a cutting device, hanging device, mudding device, sanding device, painting device, vacuum device, and the like. Other suitable devices can be part of an end effector 160 and can be selected based on any desired task that the end effector 160 can be used for.

As discussed in more detail herein, the control system 322 can receive data from the vision systems 324, 364 and/or sensors 326, 346, 366 can drive the movement systems 328, 348, 368 and one or more end effector devices 370 to perform various tasks including drywall planning, drywall hanging, applying mud or joint compound to hung drywall, sanding mudded drywall, painting, and the like. Accordingly, the control system 322 can drive the drywalling system 100 to perform various suitable tasks, with some or all portions of such tasks being automated and performed with or without user interaction. The control system can comprise various suitable computing systems, including one or more processor and one or more memory storing instructions that if executed by the one or more processor, provide for the execution of tasks by the automated drywalling system 100 as discussed in detail herein. Additionally, while a control system 322 is shown as being part of the base unit 120, in further embodiments, the control system can be part of the robotic arm 140 or end effector 160. Also, further examples can include a plurality of control systems and/or control sub-systems, which can be suitably disposed in one or more of the base unit 120, robotic arm 140, and/or end effector 160.

Figure 4:
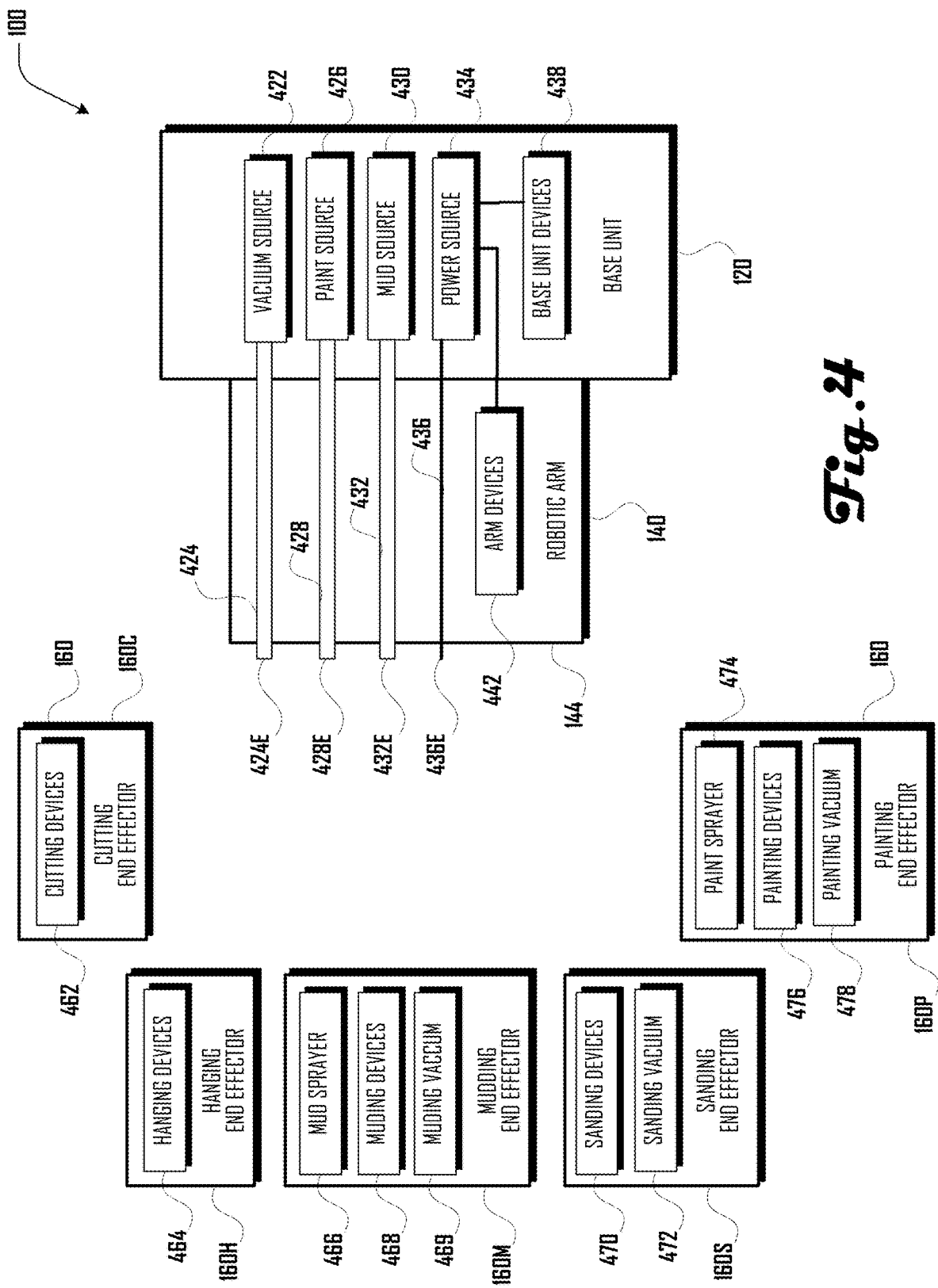
FIG. 4 is an exemplary block diagram illustrating systems of an automated drywalling system in accordance with one embodiment, including a plurality of end effectors configured to couple to an end of a robotic arm.

Turning to FIG. 4, an exemplary block diagram illustrating systems of an automated drywalling system 100 that includes a base unit 120 coupled to a robotic arm 140 and including a plurality of end effectors 160 configured to couple to the distal end 144 of the robotic arm 140. In this example, the end effectors 160 include a cutting end effector 160C, a hanging end effector 160H, a mudding end effector 160M, a sanding end effector 160S and a painting end effector 160P.

As shown in FIG. 4, the base unit 120 can comprise a vacuum source 422, a paint source 426, a mud source 430, a power source 432, and one or more base unit devices 438. In various embodiments, one or more of the vacuum source 422, paint source 426, mud source 430, and power source 432 can couple with a hub 130 (FIGS. 1 and 2) and provide resources to an end effector 160 coupled at the distal end 144 of the robotic arm 140 and/or to the robotic arm 140. For example, the vacuum source 422 can be coupled with a vacuum tube 424 that extends via the robotic arm 140 to an end 424E, which can couple with an end effector 160 as discussed herein. The paint source 426 can be coupled with a paint tube 432 that extends via the robotic arm 140 to an end 432E, which can couple with an end effector 160 as discussed herein. The mud source 430 can be coupled with a mud tube 432 that extends via the robotic arm 140 to an end 432E, which can couple with an end effector 160 as discussed herein.

The power source 434 can be coupled with a power line 436 that extends via the robotic arm 140 to an end 436E, which can couple with an end effector 160 as discussed herein. Additionally, the power source 434 can provide power to arm devices 442 of the robotic arm 140 (e.g., sensors 346 and movement system 348) and to base unit devices 438 of the base unit 120 (e.g., control system 322, vision system 324, sensors 326 and movement system 328). In various embodiments, the power source can comprise one or more batteries and/or can be configured to plug into wall receptacles at a work site. For example, a power cord can be coupled to the power source 438, which allow the drywalling system 100 to be powered by local power at a worksite via a wall receptacle, generator, external batters, or the like. However, in some embodiments, the automated drywalling system 100 can be completely self-powered and can be configured to operate without external power sources at a worksite. In further embodiments, the robotic arm 140 and/or end effectors 160 can comprise a separate power source that can be separate from the power source 438 of the base unit.

In various embodiments, the automated drywalling system 100 can be configured to perform a plurality of tasks related to installing and finishing drywall in construction. In such embodiments, it can be desirable to have a base unit 120 and robotic arm 140 that can couple with and operate a plurality of different end effectors 160 to perform one or more tasks or portions of tasks related to drywalling. For example, the cutting end effector 160C, hanging end effector 160H, mudding end effector 160M, sanding end effector 160S and painting end effector 160P can be selectively coupled with the robotic arm 140 at the distal end 144 to perform respective tasks or portions of tasks related to drywalling.

For example, the cutting end effector 160C can be coupled at the distal end 144 of the robotic arm 140 and coupled with the power line 436 to power cutting devices 462 of the cutting end effector 160C. The cutting end effector 160C can be controlled by the automated drywalling system 100 to cut drywall or perform other cutting operations. In some examples, the cutting end effector 160C can comprise a cutting vacuum that is coupled to vacuum source 422 via the vacuum line 424 to ingest debris generated by cutting done by the cutting end effector 160C.

The hanging end effector 160H can alternatively be coupled at the distal end 144 of the robotic arm 140 and coupled with the power line 436 to power hanging devices 464 of the hanging end effector 160H. The hanging end effector 160H can be controlled by the automated drywalling system 100 to hang drywall, assist with drywall hanging, or the like.

The mudding end effector 160M can alternatively be coupled at the distal end 144 of the robotic arm 140 and coupled with the power line 436 to power mudding devices 466 and/or mudding applicators 468 of the mudding end effector 160M. The mudding end effector 160M can be controlled by the automated drywalling system 100 to perform "mudding" or "mud work" associated with drywalling, including application of joint compound (also known as "mud") to joints between pieces of hung drywall, and the like. Joint compound as discussed herein can encompass pre-mixed, topping, taping, multi-use, all-purpose, and setting type compounds. Additionally, the mudding end effector can also be configured to apply joint tape, or the like. Additionally, the mudding end effector 160M can comprise a mudding vacuum 469 that is coupled to vacuum source 422 via the vacuum line 424 to ingest excess joint compound or mud generated by the mudding end effector 160M.

The sanding end effector 160S can alternatively be coupled at the distal end 144 of the robotic arm 140 and coupled with the power line 436 to power sanding devices 464 of the sanding end effector 160S. The sanding end effector 160S can be controlled by the automated drywalling system 100 to sand mudded drywall, and the like. Additionally, the sanding end effector 160S can comprise a sanding vacuum 472 that is coupled to vacuum source 422 via the vacuum line 424 to ingest debris generated by sanding done by the sanding end effector 160S.

The painting end effector 160P can alternatively be coupled at the distal end 144 of the robotic arm 140 and coupled with the power line 436 to power a paint sprayer 474 and/or painting devices 476 of the painting end effector 160P. The painting end effector 160P can be controlled by the automated drywalling system 100 to paint drywall or other surfaces. Additionally, the painting end effector 160P can comprise a painting vacuum 472 that is coupled to vacuum source 422 via the vacuum line 424 to ingest excess paint spray generated by painting done by the painting end effector 160P.

Although the example automated drywalling system 100 of FIG. 4 is illustrated having five modular end effectors 160, other embodiments can include any suitable plurality of modular end effectors 160, with such end effectors 160 having any suitable configuration, and being for any suitable task or purpose. In further examples, the automated drywalling system 100 can comprise a single end effector 160, which can be permanently or removably coupled to the robotic arm 140. Additionally, in some examples a given end effector 160 can be configured to perform a plurality of tasks. For example, in one embodiment, an end effector 160 can be configured for mud work, sanding and painting. Accordingly, the example of FIG. 4 should not be construed to be limiting on the wide variety of other embodiments that are within the scope and spirit of the present disclosure.

Figure 5:
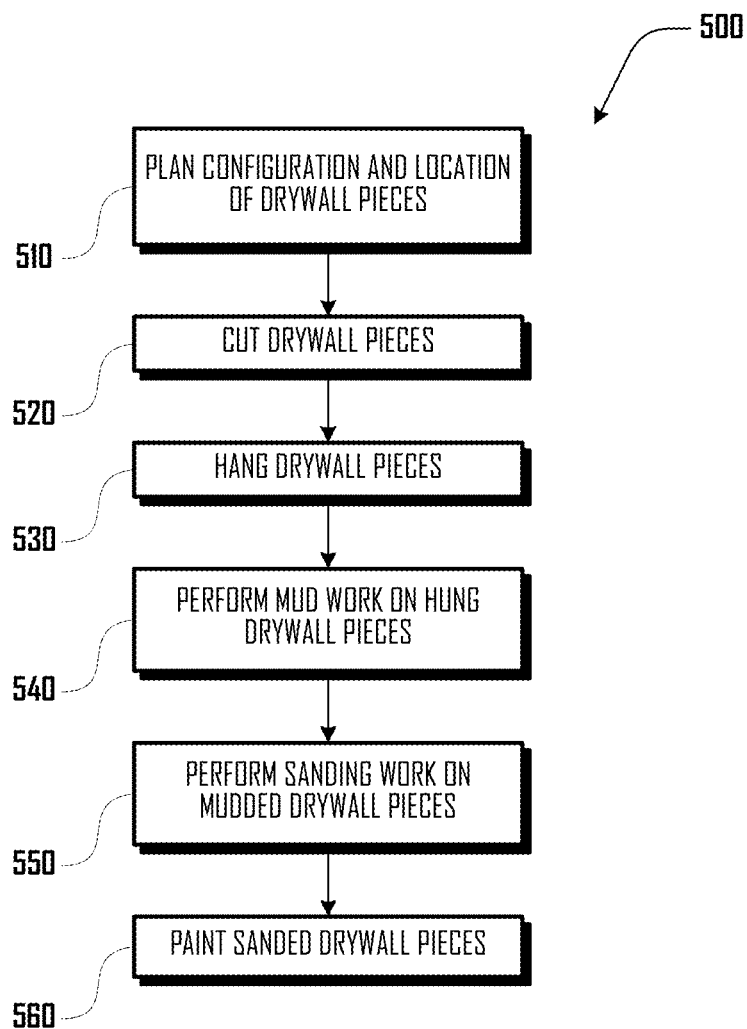
FIG. 5 illustrates a block diagram of method of installing drywall in accordance with one embodiment.

Turning to FIG. 5, a method 500 of drywalling is illustrated, which can be performed in whole or in part by an automated drywalling system 100 as discussed herein. The example method 500 or portions thereof can be performed automatically by the automated drywalling system 100 with or without user interaction.

The method 500 begins at 510, where a configuration and location of drywall pieces is planned. For example, in some embodiments, the automated drywalling system 100 can be configured for automated scanning and mapping of a worksite (e.g., framing elements of a house or building) and automated planning of the shapes and sizes of drywall to be disposed at the worksite to generate walls, ceilings, and the like. Such scanning and mapping can include use of vision systems 324, 364 (FIG. 3) and the like. Planning of shapes and sizes of drywall can be based at least in part on the scanning and mapping and can be performed by a computing device 100 of the automated drywalling system 100 or other suitable device, which can be proximate or remote from the automated drywalling system 100. In some embodiments, such planning can be based at least in part on building plans or maps that were not generated by the automated drywalling system 100.

The method 500 continues to 520, where drywall pieces are cut. Such cutting can be based at least in part on the scanning, mapping and planning discussed above. Additionally, such cutting can be performed by the automated drywalling system 100 at a worksite (e.g., via a cutting end effector 160C) or can be performed by a system remote from the worksite and generated drywall pieces can be delivered to the worksite.

At 530, generated pieces of drywall can be hung at the worksite, including hanging on studs, beams, posts, wall plates, lintels, joists, and the like, to define walls, ceilings and the like. Screws, nails or other suitable fasteners can be used to hang the drywall pieces. In some embodiments, the automated drywalling system 100 can be configured to hang drywall pieces including positioning the drywall pieces and coupling the drywall pieces in a desired location. In some examples, the automated drywall system 100 can be configured to assist a user in hanging drywall, including holding the drywall and/or tools in place while the user fixes the drywall pieces in place. In various examples a hanging end effector 160H can be used for such drywall hanging.

At 540, mud work can be performed on the pieces of hung drywall. For example, joint compound (known also as "mud") can be applied to seams or joints between adjacent pieces of drywall, over surfaces of the drywall, and/or can be applied over fasteners such as drywall screws or the like. In various examples, a mudding end effector 160M can be used to perform such mud work.

At 550, sanding can be performed on the mudded pieces of drywall. For example, where wet joint compound is applied to hung drywall pieces, the joint compound can be allowed to dry and can then be sanded by a sanding end effector 160S of an automated drywall system 100. In various examples, sanding can be performed to smooth out joint compound to generate a planar or otherwise consistent profile on the pieces of drywall in preparation for painting. At 560, the sanded drywall pieces can be painted. For example, in various examples, a painting end effector 160P of an automated drywalling system 100 can be used to paint the drywall pieces.

Although the method 500 of FIG. 5 relates to hanging and finishing drywall, it should be clear that other hanging and finishing methods can similarly be employed by the automated drywalling system 100, including methods related to hanging particle board, plywood, sheet rock, laminate, tile, wall boards, metal sheeting, lath and the like. Similarly the methods can be used with different coatings including plaster, polymer coatings, cement, stucco, organic coatings, and the like. Accordingly, the method 500 of FIG. 5 should not be construed to be limiting.

Figure 6A:
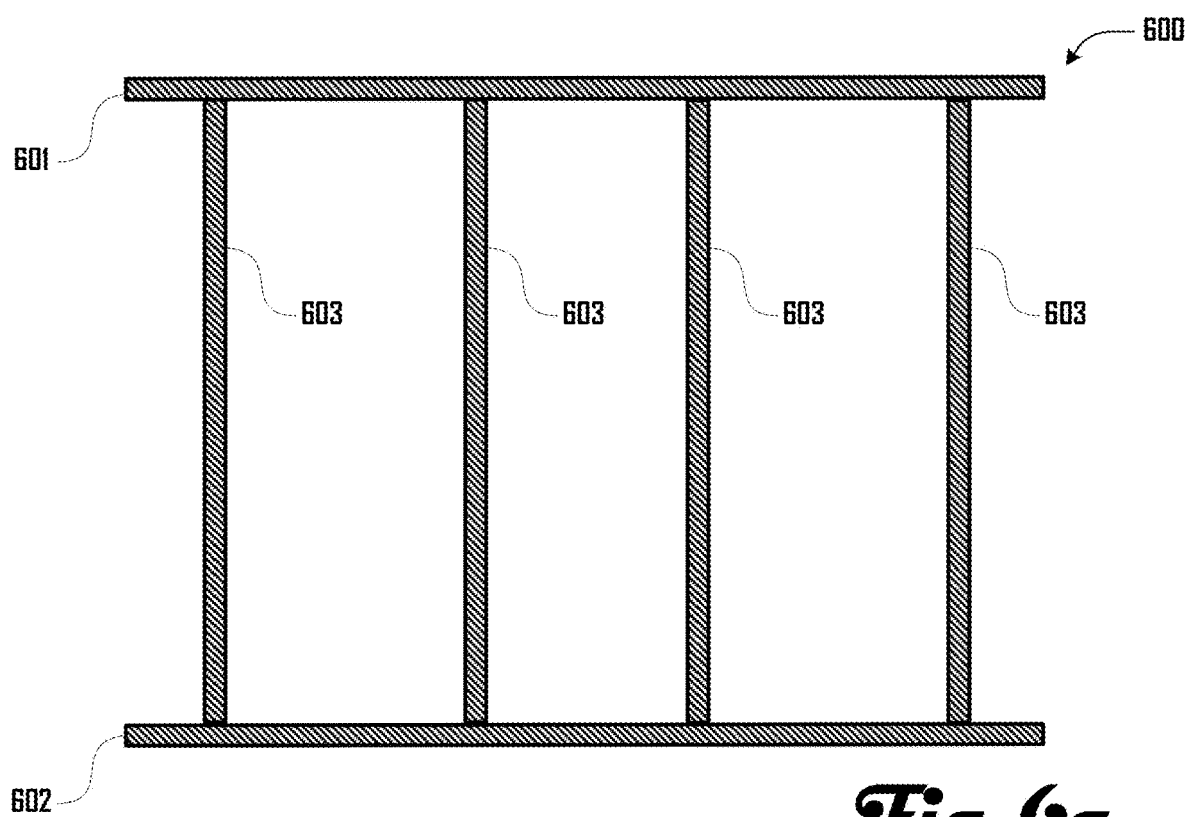
FIGS. 6a, 6b, 7a and 7b illustrate a series of steps in an example method of installing drywall to generate a wall assembly.
Figure 6B:
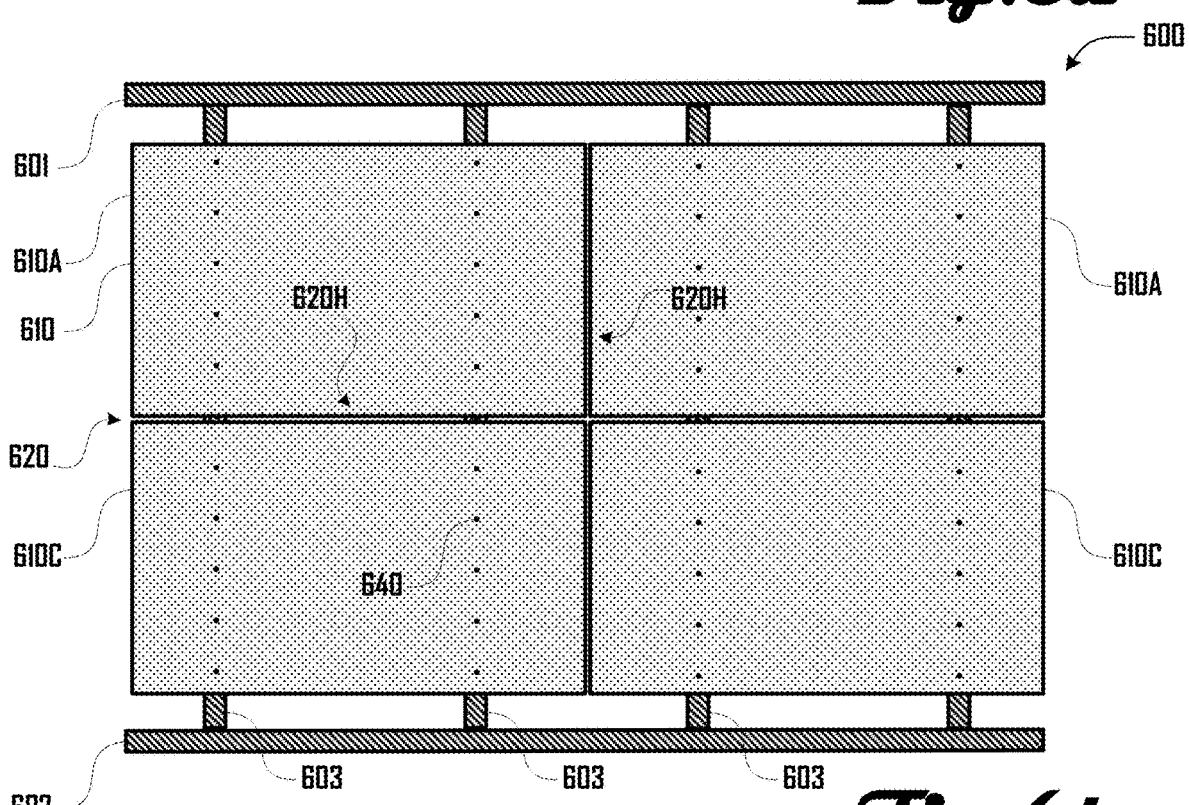
Figure 7A:
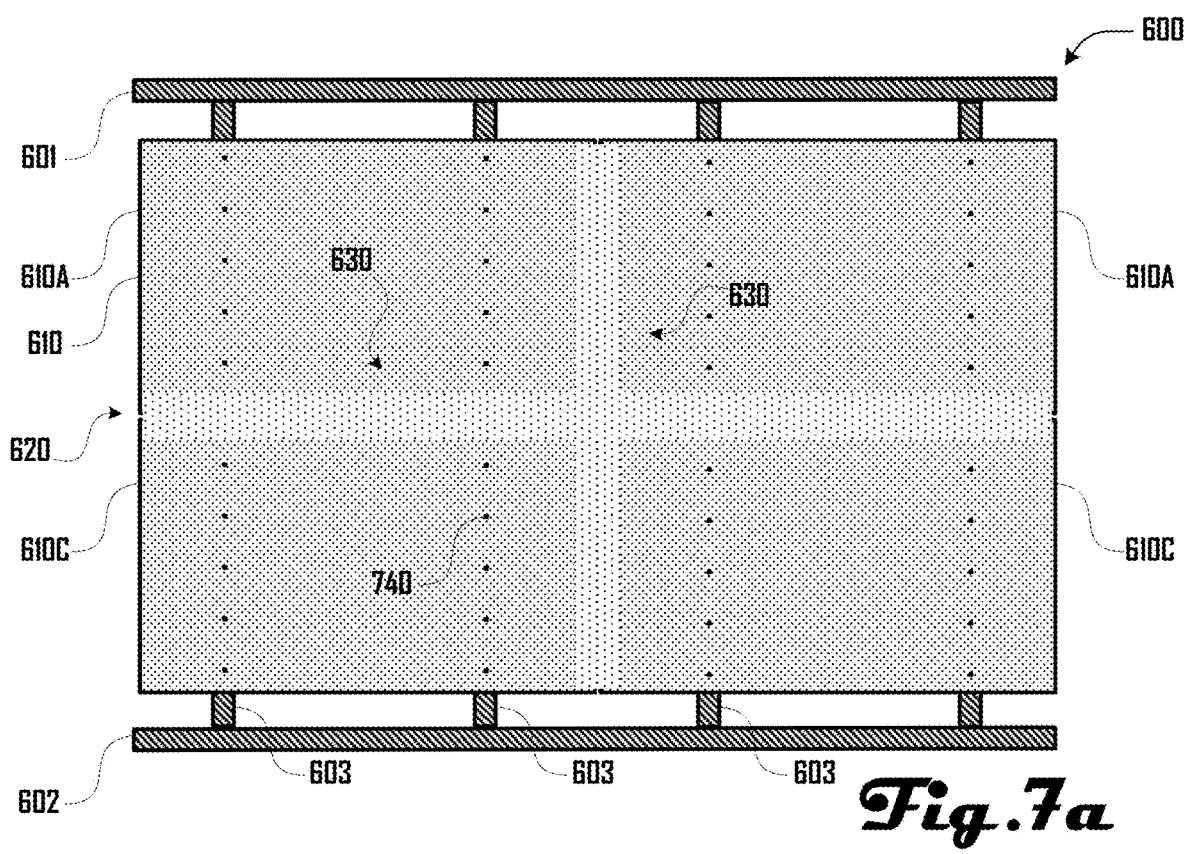
Figure 7B:
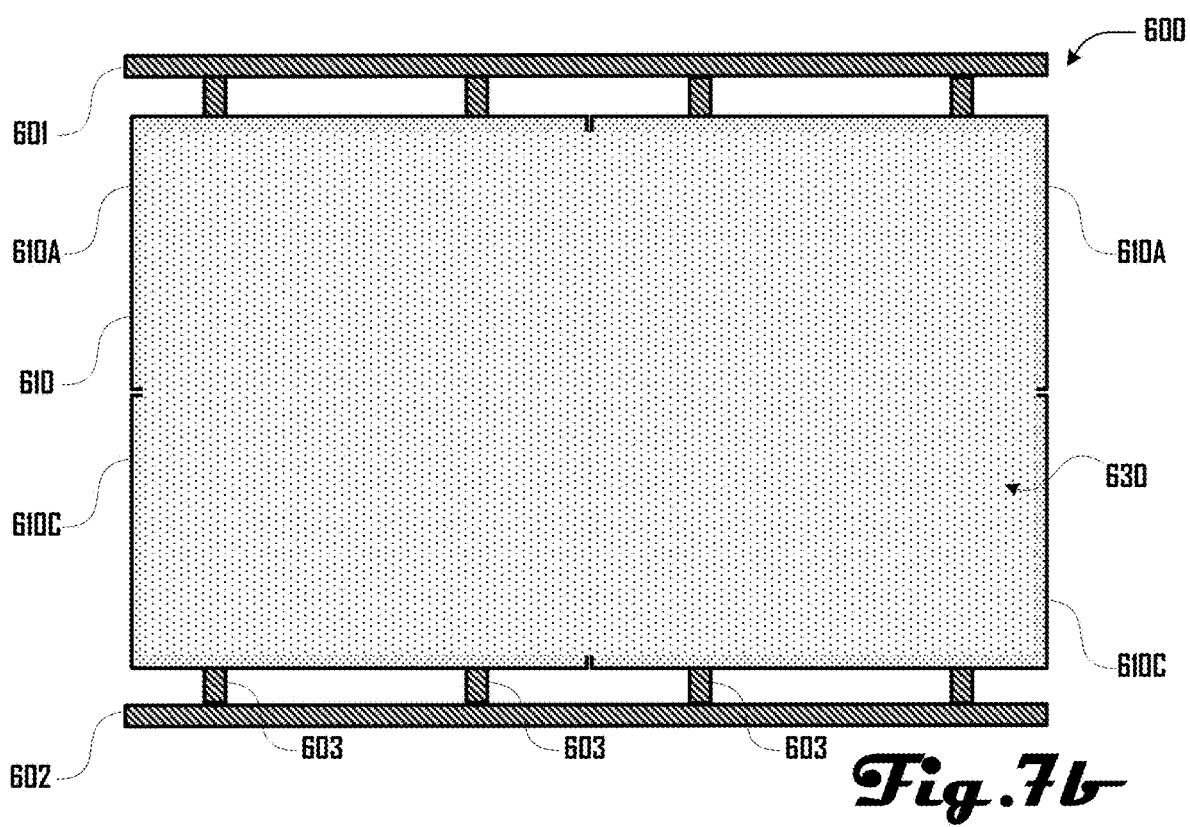

Turning to FIGS. 6a, 6b, 7a and 7b, examples of a wall assembly 600 including a plurality of drywall pieces 610A, 610B, 610C, 610D is illustrated. The wall assembly 600 can comprise a header 601 and footer 602, with a plurality of studs 603 extending therebetween. As shown in FIG. 6a, the drywall pieces 610 can be coupled to the studs 603 via a plurality of fasteners (e.g., drywall screws) that extend though the drywall pieces 610 and into the studs 603. The drywall pieces 610 can define one or more seams 620, including in the example of FIG. 6b a vertical seam 620V and a horizontal seam 630H. In some embodiments, mud work can be performed on the seams 620 as shown in FIG. 7a and leaving portions of the drywall pieces 610 without joint compound 630. Additionally or alternatively, joint compound can be applied to portions of the drywall pieces 610 in addition to about the seams 620 as shown in FIG. 7b. The wall assembly 600 of FIG. 7a or 7b can then be sanded to generate a smooth profile or other profile as desired and the sanded wall assembly can be coated with paint.

One aspect relates to an automated system 100 for cutting and hanging drywall or other substrates to cover surfaces like walls or ceilings. These substrates may or may not be covered with a coating including joint compound, plaster, stucco, insulation, or paint after they have been hung or attached to a wall assembly 600. As discussed in more detail herein, the automated drywalling system 100 can comprise a vision or mapping system, a planner, a marking system, a cutting systems, one or more robotic arms 140, one or more mobile bases 120, assist tools and stands, an augmented reality system, a user interface, a system to display maps or toolpaths in 3D on a computer or projected onto the environment, an inspection system to check placement and depth of anchors with associated images, a 2D or 3D map presenting the work performed, and any combination of these components.

In various embodiments, the automated drywalling system 100 can create a map of a construction site before the drywall 610 or other covering substrate is applied. This map or model can be created by importing building information modeling (BIM) and/or 2D, 3D plans into a planner system of the system (e.g. executed by the control system 322 or other suitable device). A map can also be created directly by the system 100 by utilizing vision systems 324, 364 and/or sensors 326, 346, 366 to scan the room. In some examples, vision systems 324, 364 can include stereo cameras, structured light, cameras, LIDAR, radar, sonar, laser scanners, thermal imaging or any combination of these components. Uploaded 3D or 2D plans can be combined with field data to create a more accurate map of the environment. Data from different sources can be combined using key features and user input. A map can include the location of the various elements of a wall assembly 600 including a header 601, footer 602, framing studs 603 as well as pipes, electrical conduit, ventilation ducts, and any other components installed on walls or ceilings. These locations can be derived from uploaded plans, a room scan and/or user inputs. To facilitate the creation of a map, a user can help identify features through analysis of images, including tagging of features physically or digitally. The user can physically tag components using various suitable elements, including but not limited to, a laser, tags, markers or a combination of these. The vision systems 324, 364 and/or sensors 326, 346, 366 can pick up these tags or track such tags as a user moves around the room and locates the features.

The automated drywalling system 100 can comprise a computational planner (e.g., executed by the control system 322 or other suitable device) which can utilize a map uploaded to the system and/or a map created by a mapping system of the system 100 to create a layout for how to cover the target surfaces of a wall assembly 600 with drywall 610 or other substrate. The planner can optimize the layout of the substrate for any of the following conditions including but not limited to, minimizing waste, minimizing substrate material used, minimizing coating material required to complete the surface, minimizing number of seams 620, joints or interfaces, minimizing cuts, or any combination. The system 100 can also optimize the layout for sound insulation, fire resistance, type of framing, coating to be applied, location of vents, placing seams, joints, or interface in the most accessible positions or away from the harshest lighting conditions. Repair and maintenance considerations can also be input into the planner resulting in the planner creating a layout that facilitates access to key pipes, vents, electrical connections and minimizes damage to the rest of the surface as a result of removing one panel. The planner can take direct input on the layout from the plans, map or architectural specifications. The planner can also reduce the size of the pieces to reduce the work required to bring into the room. Geographical and building information can also serve as an input to the planner including ground stability, room use, propensity for natural disasters, and the like.

The planner can determine how a room should be covered using drywall 610 or other substrate and output how each board or piece should be cut to fit the model. The automated drywalling system 100 can use this information to directly cut or score the boards using a cutting tool on a gantry, router system or the robotic manipulator. For example, in one embodiment a cutting end effector 462 can be used to cut pieces of drywall 610. The system 100 can also visually mark the cuts on drywall 610 using a laser, marker, paint, chalk or other visual method to guide a worker as to where the drywall 610 should be cut. The worker can then cut the drywall 610 using a knife, power saw, router, or the like. The automated drywalling system 100 can comprise a gantry system that positions a cutting tool or marker in two dimensions. A linear stage can then be used to move the tool into the board. The system 100 can be designed to minimize waste. The automated drywalling system 100 can also be used to create partial cuts that allow for the drywall 610 or board to be folded to create a continuous corner or curvature. The automated drywalling system 100 can also utilize custom board pieces or sizes that are designed to enable a robotic manipulator or operator to hang the drywall. In some embodiments, the system 100 can send the information on how to cut drywall 610 to an off-site system. The pieces of drywall 610 cut off-site can then be delivered to the site for installation. The system 100 can also mark pieces of drywall 610 or other suitable substrate to individually label them so that the pieces of drywall 610 can be referenced back to a map, plan, instructions, or the like.

Turning to FIG. 8 an example embodiment 100A of an automated drywalling system 100 is illustrated, which includes a base unit 120, robotic arm 140, and a cutting end effector 160C having one or more cutting tool 462. The base unit 120, robotic arm 140, and/or end effector 160 can be used to position the one or more cutting tool 462 along the length and width of the drywall board 610 that can be disposed on a platform 805 as shown in FIG. 8, or can be disposed on the ground, or on a stack of drywall 610. The system 100 can drive the one or more cutting tool 462 into the surface of the drywall 610 to cut, score, or mark the surface of the drywall 610. Toolpaths for the system 100 can be created using a planner can optimize how the drywall 610 is cut and hung to cover a surface (e.g., a wall assembly 600).

Figure 9:
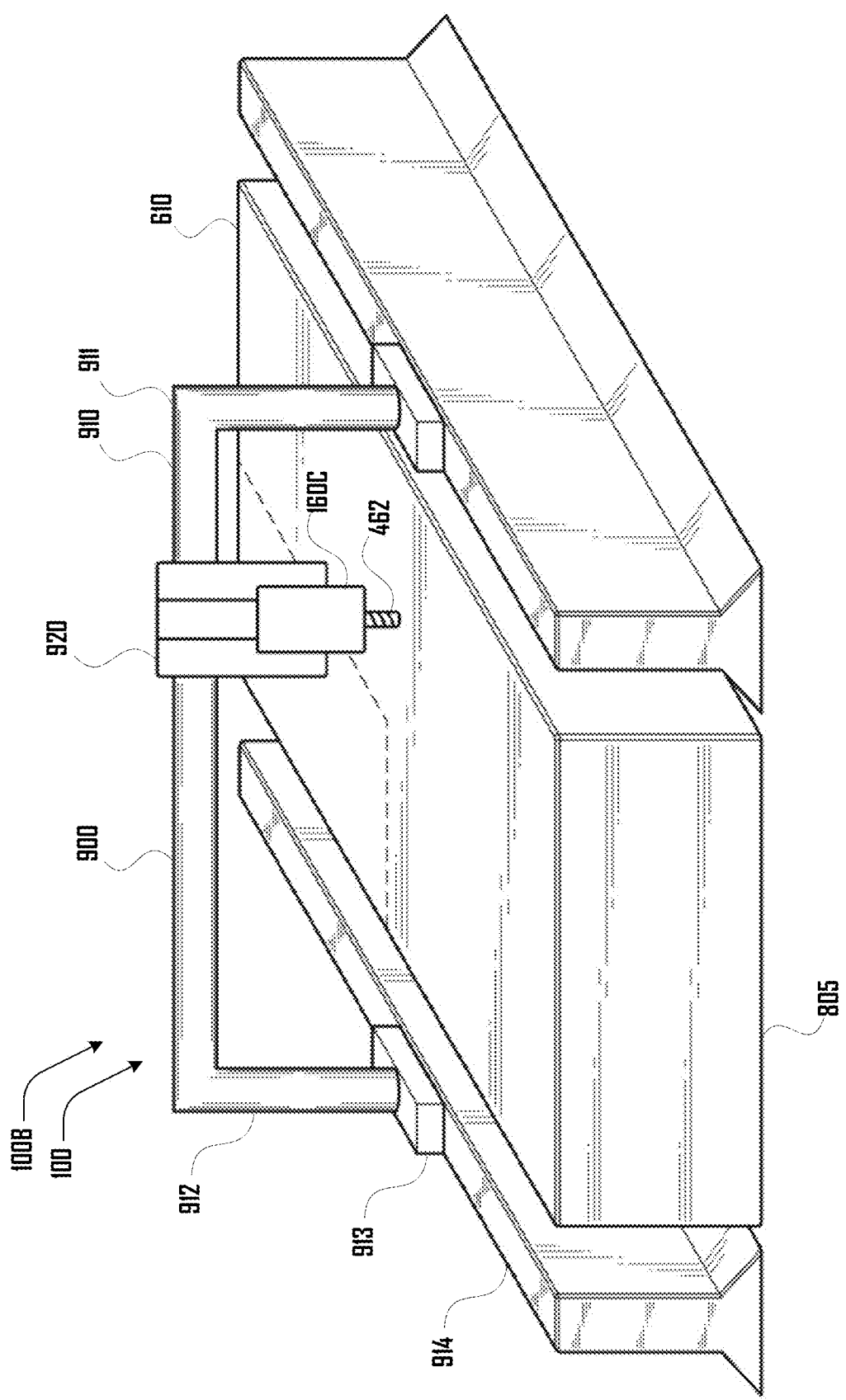
FIG. 9 illustrates another example embodiment of an automated drywalling system that comprises a gantry assembly that can be used to position a cutting tool of a cutting end effector along the length and width of a drywall board.

Although various embodiments can include an automated drywalling system 100 that comprises a base unit 120, robotic arm 140, and/or end effector 160 as shown in FIGS. 1, 2 and 8, further embodiments can additionally or alternatively include any other suitable cutting assembly. For example, FIG. 9, illustrates another example embodiment 100B of an automated drywalling system 100 is illustrated that comprises a gantry assembly 900 that can be used to position a cutting tool 462 of a cutting end effector 160C along the length and width of a drywall board 610.

The gantry assembly 900 can comprise a gantry 910 having a gantry bar 911 with a pair of gantry legs 912 extending to gantry feet 913, which can move along respective rails 914. A linear stage 920 can be mounted on and move along the gantry bar 911 and the linear stage 920 can move the cutting end effector 160C and one or more cutting tools 462 up and down about the drywall 610 to move the one or more cutting tools 462 into the surface of the drywall 610 to cut, score, or mark the surface of the drywall 610. The toolpaths for the system 100 can be created using a planner, which optimizes how the drywall 610 is cut and hung to cover a surface as described herein.

The automated drywalling system 100 can produce a visualization, paths, or instructions or a combination of these to guide how drywall 610 or other suitable substrate is to be installed or hung. A visualization can include 2D or 3D maps marking joint outlines and can include numbers indicating an order that the pieces of drywall 610 should be installed in. Instructions can also be provided to the user indicating which piece of drywall 610 is to be placed where and in which order. Such instructions can include visual and/or auditory instructions. In one example, a visualization system can include a projection of a plan onto a target surface. For example, such a visualization can be done with a laser system, projector, through augmented reality headset or goggles worn by a user, or the like.

Figure 10:
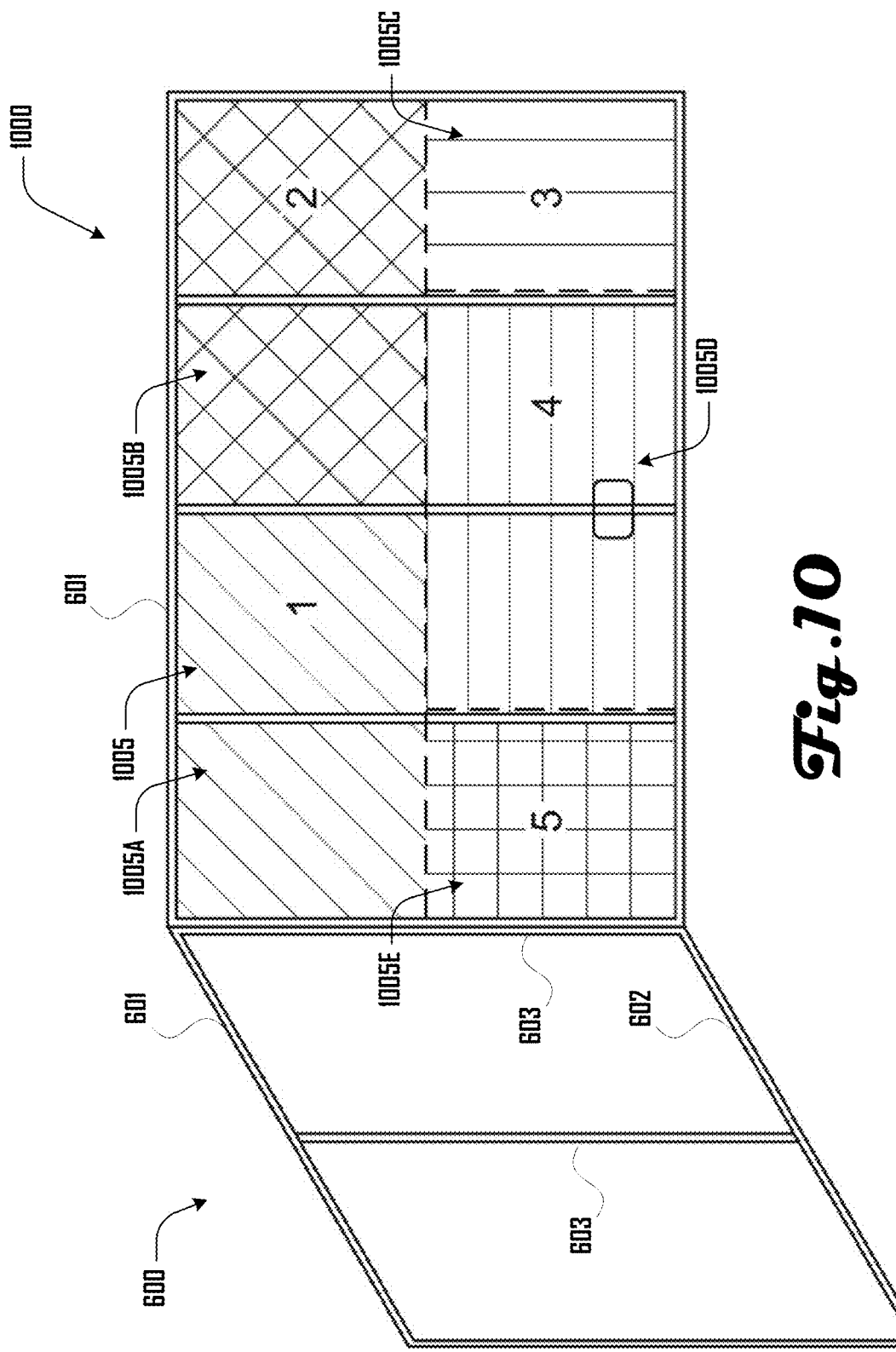
FIG. 10 illustrates an example of a visualization being projected onto a wall assembly that provides instructions to a user and/or the system 100 for hanging a plurality of pieces of drywall.

For example, FIG. 10 illustrates an example of a visualization 1000 being projected onto a wall assembly 600 that provides instructions to a user and/or the system 100 for hanging a plurality of pieces of drywall 610. In the example of FIG. 10, the visualization 1000 includes five visualization portions 1005A, 1005B, 1005C, 1005D, 1005E that are projected onto the wall assembly via any suitable method including, but not limited to via a user interface, via a projector via a laser system, via an augmented reality headset or goggles, or the like.

The visualization portions 1005 can define an order that a user or the system should hang pieces of drywall 610. For example, the first visualization 1005A can correspond to a first piece of drywall 610 that should be hung on the wall assembly 600, the second visualization 1005B can correspond to a second piece of drywall 610 that should be hung on the wall assembly 600, and so forth. Alternatively, the visualization portions 1005 need not correspond to a specific order and can be indicative of separate pieces of drywall 610 to be hung on the wall assembly in any suitable order.

The visualizations portions 1005 can be identified as being separate in various suitable ways, including via different patterns as shown in FIG. 10, via different colors, via different animations, via different numbers, via different letters, and the like. In some examples, the visualization portions 1005 can be respectively removed or changed when a corresponding piece of drywall 610 is hung. For example, where a piece of drywall 610 is hung in the third visualization portion 1005C, the visualization portion can be removed (e.g., by no longer being projected) while other portions 1005 without drywall hung being maintained.

In another example, visualization portions 1005 can indicate correct or incorrect hanging or drywall pieces 610 during or after the hanging of such pieces of drywall 610. For example, a visualization portion 1005 can be colored red while a piece of drywall 610 is being hung corresponding to that visualization portion 1005 and when the piece of drywall 610 is in a position that is determined to be correct, the visualization portion 1005 can turn green to indicate correct positioning of the drywall piece 1005 on the wall assembly 600. Such a change from red to green can be done before or after the drywall 610 is coupled to the wall assembly 600 (e.g., via fasteners 640, or the like).

Similarly, a visualization 1000 can provide cues as to an order that drywall 610 is to be hung, including the next piece of drywall 610 that should be hung. For example, where an order of hanging begins with the first visualization portion 1005A and continues to the second 1005B, third 1005C, fourth 1005D and fifth portions 1005E, the first portion 1005A can blink to indicate that this drywall piece 610 should be hung on the wall assembly 600 in a position corresponding to the first visualization portion 1005A first.

Additionally, a visualization 1000 can project visualization portions 1005 onto pieces of drywall to assist a user and/or the system 100 in identifying drywall pieces that should be hung on a given portion of a wall assembly 600 corresponding to a given visualization portion 1005 on the wall assembly 600. For example, a visualization portion 1005 can be projected onto a piece of drywall 610 that is to be hung next and the visualization portion 1005 can follow the piece of drywall 610 as it is being moved, hung and coupled to the wall assembly 600. In various embodiments, a pattern, color, number or other suitable indicator can match between the visualization portion on a piece of drywall 610 and a portion of a wall assembly 600 to indicate correspondence between the two.

Also, while visualizations 1000 and visualization portions 1005 can relate to locations on a wall assembly 600 where pieces of drywall 610 are to be hung, in further embodiments, visualizations 1000 and visualization portions 1005 can relate to various other aspects of drywalling, including the location of portions of a wall assembly 600 behind pieces of drywall, indications of how to correctly position pieces of drywall 610, and locations where fasteners 640, or the like should be applied.

Pieces of drywall 610 can be hung by the automated drywalling system 100 and/or human operators. For example, in some embodiments an automated drywalling system 100 having a hanging end effector 106H can automatically pick up and hang pieces of drywall 610 including coupling drywall 610 to a wall assembly 600 via fasteners (e.g., drywall screws), and adhesive, or the like. In another example, an automated drywalling system 100 having a hanging end effector 106H can automatically pick up and position pieces of drywall 610 at a wall assembly 600 and a user can fasten or otherwise couple the pieces of drywall to the wall assembly.

Maps created by the system 100 (e.g., 2D, 3D or the like) can be registered to a physical environment (e.g., a wall assembly 600 or other worksite) utilizing recognizable features such as doors, windows, outlets, corners or the like. Such registration can be done in various suitable ways, including using markers, tags, or laser outlines, or the like, that are placed in a room or other worksite. A projection or visualization system can find the features or markers and can locate a map using the same. The system 100 can utilize a user interface to enable a user to help locate a map or projection relative to the environment and resolve any issues or discrepancies. The user can utilize a physical marker to signify key features for the system 100 allowing the system 100 to locate a map 100 relative to the environment. The system 100 can also use the base unit 120, robotic arm 140, and/or end effector 160 to find target features, markers or surfaces and locate such relative to the base 120 which can be located using a localization system that can include one or more of the vision systems 324, 364 and/or sensors 326, 346, 366 (e.g., including laser range finders, computer vision, LIDAR, radar, sonar, stereo vision, odometry, IMUs, or the like).

A planner resource of the system 100 (e.g., executed by the control system 322) can also output tool paths for the base unit 120, robotic arm 140, and/or end effector 160 to install drywall 610 or assist a user during the installation. The tool paths can include joint commands, target poses and end effector positions, and any combination of these to pick up drywall 610 from a pile of drywall 610, move the drywall 610 to a target surface, rotate and position the drywall 610 as required, move the drywall 610 into position, install anchors or fasteners 640, and the like. The system 100 can also output paths for a gantry system, which can pick-up, move, position, or anchor pieces of drywall 610. The planner resource can also output paths for the mobile base 120 to follow to deliver the pieces of drywall 610, position a gantry or robotic arm 140, move a tool to assist a user in the hanging process, position visualization and/or lighting equipment, and the like. The mobile base 120 can work in coordination with the user, robotic arm 140, end effector 160, gantry or a combination of these to execute various tasks. The position of the mobile base 120 can be used as a rough positioning stage, with the vertical lift 126 setting the height of the robotic arm 140 and/or end effector 160, which can act as a fine positioning stage.

The automated drywalling system 100 can utilize a user interface to enable a worker to control, program, debug, plan, and setup the system 100. The user interface can be used to give the user information of some or all the steps that must be taken to setup the system 100. Each step can be checked off when complete and the user can request more information on each step. The workspace of the system 100 can be shown overlaid on a camera feed or projected onto a target surface to help the user position the base unit 120, robotic arm 140, and/or end effector 160. A workspace can be projected using lights, lasers, or the like. The system 100 can also automatically perform certain steps and the user interface can report the progress of each step, as well as give guidance to the steps the user can follow to perform various tasks. The user interface can be used to setup the system 100 and run any calibration routines required. The interface can also be used to plan the job including detecting a wall, user definition of path parameters or path itself, auto generation of the tool path, user input of tool parameters, and automatically optimized tool parameters given a set of user inputs.

The user interface can be a graphical user interface and include a 2D or 3D representation of a worksite and/or workspace. The representation can include camera feeds as well as computer models, reconstructions created using sensor data, and the like. The interface can overlay paths, quality visuals, progress, a robot model, or the like, over camera or workspace models. As the task is completed the path can be highlighted in different colors or with different style lines to indicate completion, quality achieved, problem areas among others.

Any problems, issues, or bugs can be reported in the user interface. Lights on the base unit 120, robotic arm 140, and/or end effector 160 as well as sounds can also be used to indicate problems, cart and robot motion, work is in progress, system is on or off, toolpath is running or paused, system needs attention or materials, and any other indicators of the system state. The user interface can also display information on the progress, task and tool parameters, and quality metrics of the task being performed. Environmental conditions can also be displayed and recorded by the interface. The system 100 can indicate to the user what steps to take to correct or improve conditions including air quality, temperature, humidity, and the like. If the system 100 detects unsuitable or unsafe conditions it can display a message warning the user and providing guidance on next steps. The system 100 can use an optimization to find what parameters could be used to improve the process including reducing work time, increasing quality, and minimizing material usage among others. In various examples, a user interface can create reports on the tasks executed, quality metrics, environmental conditions, completion, performance logs, and the like. Information can include robot workspace, tool paths, progress, sequence of approach, coverage record, path speed, tracking error, time to complete the task, tool time, setup time, cleaning time, and the like.

An augmented reality system can be used to show a worker a layout plan generated by the system 100, instructions, original BIM or plan, or a combination of these. The augmented reality can be displayed using a headset, smart goggles, projections, and the like. The worker can be shown how to cut a board of drywall 610 by overlaying cuts on the drywall 610 that he or she is looking at, they can be shown the orientation and position of the drywall 610 within the room, and the location of studs 603, framing, pipes, ducts, electrical system behind the drywall 610 to facilitate installation of the anchors, fasteners 640, or the like. A fastening tool can be tracked in a map using tags, IMUs, or other sensors and a warning can be given to the operator if an attempt is made to install a fastener 640 in an erroneous position where it cannot securely attach to a wall assembly 600, could damage electrical or plumbing, or the like. The system 100, including the base unit 120, robotic arm 140, and/or end effector 160 can also utilize radar, sonar, thermal imaging, or the like to establish what is behind the drywall 610.

Once the pieces of drywall 610 are cut a next step can be to hang the cut pieces of drywall 610 on a wall assembly (e.g., on wood framing, metal furring, or the like). The automated drywalling system 100 can facilitate this process by utilizing a base unit 120, robotic arm 140, end effector 160, gantry system, or the like, to assist a worker with lifting the drywall or for the system 100 to independently move and position the drywall. In some embodiments, the base unit 120, robotic arm 140, end effector 160, gantry system, or the like, can screw or nail the board into the studs. Similarly the base unit 120, robotic arm 140, end effector 160, gantry system, or the like, to assist a worker with lifting the drywall or for the system 100 to independently move and position the drywall. In some embodiments, the base unit 120, robotic arm 140, end effector 160, gantry system, or the like can hold the drywall 610 in place while the worker screws or nails it to frames or other portion of a wall assembly 600. A single robotic arm 140 or any suitable plurality of robotic arms 140 can be used to complete various drywalling tasks through coordinated or individual paths. The robotic arm 140, and/or end effector 160 can be moved around the room using the mobile base 120 that can be powered and/or can moved manually by an operator. The base unit 120, robotic arm 140, and/or end effector 160 can include one or more vision systems 324, 364 and/or sensors 326, 346, 366 to ensure safe operation next to a user. Safety vision systems 324, 364 and/or sensors 326, 346, 366 can include but are not limited to laser curtains, proximity sensors, force and torque sensors, pressure sensors, limit switches, system to track location of the user relative to the base unit 120, robotic arm 140, and/or end effector 160, speed limiters, LIDAR, radar, sonar, or any combination of these. The mobile base 120 can include a vertical lift 126 component that can be powered or unpowered. The vertical lift 126 can be used to lift or lower robotic arm 140 and/or end effector 160. The lift 126 can be instrumented with a position sensor that can be used to capture and control the height of the lift 126.

The base unit 120, robotic arm 140, and/or end effector 160 can utilize a compliant end or force limiting effector to enable safe contact with the environment allowing the system 100 to accurately locate target surfaces, features or components, install drywall 610 without damaging the wall assembly 600, accommodate errors in positioning without damaging the base unit 120, robotic arm 140, and/or end effector 160, and the like. By utilizing the base unit 120, robotic arm 140, and/or end effector 160 to locate a physical component the system 100 can establish a point, line, or plane and therefore locate the virtual plan on the environment. The system 100 can utilize one or more vision systems 324, 364 and/or sensors 326, 346, 366 (e.g., radar, sonar, thermal imaging, or the like) to establish what is behind the substrate, this information can be used to update a virtual map and ensure that fasteners 460 are securely attached and do not damage any part of any systems such as electrical, plumbing, ventilation. The hanging of the drywall 610 can also be done through a gantry system or x-y-z positioning stage. The system 100 can be used to install drywall 610, lath or other substrates used to create surfaces.

The base unit 120, robotic arm 140, and/or end effector 160 can utilize multiple control strategies to complete various drywalling tasks. Position control can be used to command the system 100 to follow a trajectory given speed, acceleration, jerk constraints, and the like. The system 100 can be controlled at the joint level by giving commands to joints to achieve the desired robot state, tool parameters and/or tool position, or control can be done at a higher level in some examples allowing the user or program to control position and orientation of the end effector 160 only. The system 100 can be controlled in task space where the system 100 controls the tool relative to the task. This approach can focus on achieving a desired tool position, orientation, speed relative to a target surface, or the like, rather than on each joint of the base unit 120, robotic arm 140, and/or end effector 160 reaching its target goal. The automatic drywalling system 100 can utilize force control to control the force applied to a target surface, an obstacle, adjacent surfaces, objects, and the like. The applied force can be controlled in a single axis or multiple axes. Hybrid control modes can also be used in various examples. For example, the system 100 can be commanded to achieve a given position as long as a given force is not exceeded.

The automated drywall system can utilize a room model and one or more of vision systems 324, 364 and/or sensors 326, 346, 366 to ensure that a quality installation is achieved. For example, the system 100 can use vision systems 324, 364 and/or sensors 326, 346, 366 to establish the condition of the wall assembly 600 after hanging, mudding, sanding and/or painting drywall. The system 100 can use vision systems 324, 364 and/or sensors 326, 346, 366 (e.g., structured lights, stereo cameras, images, lights and shadows, LIDAR, radar, sonar, point clouds or the like) to establish the conditions of the surface of a wall assembly 600 at any suitable stage. These conditions can include establishing a plane relative to a tool of an end effector 160, detecting high or low points, curvature, defects, and the like. The vision systems 324, 364 and/or sensors 326, 346, 366 can be used to create a topographical map of the surface to identify high and low spots. The map can be updated by the vision systems 324, 364 and/or sensors 326, 346, 366 as the system 100 is moved around the room. The system 100 can also utilize rollers, proximity sensors, contact sensors, profilometers, and the like, to measure the profile of the surface. The base unit 120, robotic arm 140, and/or end effector 160 can be used to make contact with rollers or other mechanism on an encoded linear stage and then move these over the surface creating a topographical map. This can be done over joints or seams 620 to determine the profile of a surface of a wall assembly 600. The system 100 can use this map to indicate to the user or automated drywalling system 100 when a board needs to be shimmed to achieve a desired plane. The vision systems 324, 364 and/or sensors 326, 346, 366 can be used to check that the hanging process has been completed as prescribed and highlight any problem areas like high or low points. An inspection system can also be used to check that the fasteners 460 (e.g., screws, anchors, or the like) are spaced correctly according to a plan or code and that the fasteners 460 have been installed at correct depths. A detailed plan showing the location of the fasteners 460 can be used to facilitate inspections and can be accompanied with images of each fastener 460. A mapping system can be used to scan the room after the drywall 610 has been hung to update a model to as-built conditions or create an additional layer of the model. The as-built map can be used as an input to automated drywalling system 100 indicating how drywall compound, sanding or paint should be applied to achieve the desired visual flatness and finish.

The system 100 can generate reports and interface with other software platforms including BIM packages. Reports can be created that can be used for inspection and certification. A report can be customized to provide the information required to pass a standard, test, or certification. The reporting system can also provide a live update of the current task progress and live camera feed. This information can be used to help track asset performance and work progression. The data can be reported to a BIM system or other software to facilitate planning of other trades, next steps, or schedule inspections or other tasks. The reports can include full maps of the work done and tool and path parameters utilized to complete the task. Further images or video can be recorded to facilitate quality checks or for tracking of issues. The system 100 can record parameters used to complete various drywalling tasks, which can be fed to a machine learning software to enable the system 100 to learn from past work. The reports can also be used to optimize workflow and scheduling. A system optimization function can be updated to meet the desired needs including minimizing task time, completion of the task in a part of the worksite to allow other trades to come in, minimizing cost, optimal use of assets and workforce, among others. The system's reports can also include information on environmental conditions and how the process was changed given the conditions.

The automated drywalling system 100 can create a report that shows where and how the drywall 610 was hung. The report can include BIM, 3D and 2D maps or plans, images, video. The maps provided by the system 100 can be used to facilitate repairs and maintenance by providing the customer with the location of components behind the wall as well as the location of seams 620 to facilitate the removal of pieces of drywall 610 or other substrate.

Updated room models that reflect the as-built conditions and measurements can be exported for use in finishing walls (e.g., mudding, sanding, painting, and the like). These models can be the inputs to automated drywalling system 100 and/or used by workers to complete manual work. The automated drywalling system 100 can work in conjunction with a larger system that plans the full process from mapping, to cutting and hanging to finishing and painting of the surfaces. The system 100 can be used for covering various surfaces with any suitable substrate including drywall, lath, joint compound, plaster, stucco, cement, paint or the like.

The described embodiments are susceptible to various modifications and alternative forms, and specific examples thereof have been shown by way of example in the drawings and are herein described in detail. It should be understood, however, that the described embodiments are not to be limited to the particular forms or methods disclosed, but to the contrary, the present disclosure is to cover all modifications, equivalents, and alternatives.

What is claimed is:

1. An automated drywalling system for cutting drywall and hanging drywall on a wall assembly, the automated drywalling system comprising:
    a base unit that includes:
        a platform,
        a cart configured to be disposed on and move on the ground, and
        a lift disposed between the platform and cart, the lift configured to raise the platform up and down;
    an elongated robotic arm that extends between a base end and a distal end, the robotic arm coupled to the base unit on the platform at the base end of the robotic arm;
    a cutting end effector configured to be coupled at the distal end of the robotic arm, the cutting end effector including a cutting head configured for cutting drywall;
    a hanging end effector configured to be coupled at the distal end of the robotic arm, the hanging end effector configured to hang pieces of drywall on a wall assembly;
    one or more vision systems;
    one or more sensors;
    a computing device executing a computational planner that:
        obtains target wall assembly data from the one or more vision systems and the one or more sensors, the target wall assembly data including information regarding a configuration of a target wall assembly including a plurality of studs that define a portion of the target wall assembly;
        automatically generates, before hanging any of a plurality of drywall pieces, a plan for a configuration of the plurality of drywall pieces to be disposed on studs of the target wall assembly based on the target wall assembly data;
        automatically generates, instructions for driving the cutting end effector, robotic arm, and base unit to perform at least one cutting task that includes the cutting end effector cutting one or more pieces of drywall to generate cut pieces of drywall having a configuration based on the generated plan for the configuration of a plurality of drywall pieces to be disposed on studs of the target wall assembly;
        automatically drives, the cutting end effector, robotic arm, and base unit to perform the at least one cutting task to generate the cut pieces of drywall having a configuration based on the generated plan for the configuration of a plurality of drywall pieces to be disposed on studs of the target wall assembly;
        automatically generates instructions for driving the hanging end effector, robotic arm, and base unit to perform at least one hanging task that includes the hanging end effector hanging the cut pieces of drywall on studs of the target wall assembly, the generation of instructions for the at least one hanging task being based on the plan for the configuration of a plurality of drywall pieces to be disposed on studs of the target wall assembly; and automatically drives the hanging end effector, robotic arm, and base unit to perform the at least one hanging task to hang the cut pieces of drywall on studs of the target wall assembly; and a visualization system that generates a visualization projected onto the target wall assembly that provides instructions to a user and to the automated drywalling system for hanging the plurality of cut pieces of drywall on the target wall assembly, wherein the visualization system comprises at least one of a light projector system and an augmented reality system, and wherein the automated drywalling system uses said instructions for hanging the plurality of cut pieces of drywall on the target wall assembly to guide how the plurality of cut pieces of drywall are to be hung on the target wall assembly.

2. The automated drywalling system of claim 1, wherein the hanging end effector is configured to couple the plurality of cut pieces of drywall on the wall assembly via fasteners.

3. An automated drywalling system comprising:
a base unit;
an elongated robotic arm that extends between a base end and a distal end, the robotic arm coupled to the base unit at the base end of the robotic arm;
a cutting end effector configured to be coupled at the distal end of the robotic arm, the cutting end effector including a cutting head configured for cutting drywall;
a hanging end effector configured to be coupled at the distal end of the robotic arm, the hanging end effector configured to hang pieces of drywall on a wall assembly;
one or more vision systems;
a computing device executing a computational planner that:
obtains target wall assembly data from the one or more vision systems, the target wall assembly data including information regarding a configuration of a target wall assembly including a plurality of studs that define a portion of the target wall assembly; and
automatically generates, before hanging any of a plurality of drywall pieces, a plan for a configuration of the plurality of drywall pieces to be disposed on studs of the target wall assembly based on the target wall assembly data; and
a visualization system that generates a visualization on the target wall assembly that illustrates instructions to at least one of a user and the automated drywalling system for hanging the plurality of cut pieces of drywall on the target wall assembly, wherein the visualization system comprises at least one of a light projector system, an augmented reality system and a user interface, and wherein the automated drywalling system uses said instructions for hanging the plurality of cut pieces of drywall on the target wall assembly to guide how the plurality of cut pieces of drywall are to be hung on the target wall assembly.

4. The automated drywalling system of claim 3, wherein the computational planner further:
automatically generates, instructions for driving the cutting end effector, robotic arm, and base unit to perform at least one cutting task that includes the cutting end effector cutting one or more pieces of drywall to generate cut pieces of drywall having a configuration based on the generated plan for the configuration of a plurality of drywall pieces to be disposed on studs of the target wall assembly; and automatically drives the cutting end effector and robotic arm to perform the at least one cutting task to generate the cut pieces of drywall having a configuration based on the generated plan for the configuration of a plurality of drywall pieces to be disposed on studs of the target wall assembly.

5. The automated drywalling system of claim 3, wherein the computational planner further:
automatically generates instructions for driving the hanging end effector, robotic arm, and base unit to perform at least one hanging task that includes the hanging end effector hanging cut pieces of drywall on the studs of the target wall assembly, the generation of instructions for the at least one hanging task being based on the plan for the configuration of a plurality of drywall pieces to be disposed on studs of the target wall assembly; and
automatically drives the hanging end effector, robotic arm, and base unit to perform the at least one hanging task to hang the cut pieces of drywall on studs of the target wall assembly.

6. The automated drywalling system of claim 3, wherein the hanging end effector is configured to couple the plurality of cut pieces of drywall on the wall assembly via fasteners.

7. An automated drywalling system comprising:
one or more vision systems;
a computing device executing a computational planner that:
obtains target wall assembly data from the one or more vision systems, the target wall assembly data including information regarding a configuration of a target wall assembly including a plurality of studs that define a portion of the target wall assembly; and
generates, before hanging any of a plurality of drywall pieces, a plan for a configuration of the plurality of drywall pieces to be disposed on studs of the target wall assembly based on the target wall assembly data; and
an electronic visualization system that presents a visualization associated with the target wall assembly that provides instructions for hanging the plurality of cut pieces of drywall on the target wall assembly, and wherein the automated drywalling system uses said instructions for hanging the plurality of cut pieces of drywall on the target wall assembly as a guide to how the plurality of cut pieces of drywall are to be hung on the target wall assembly.

8. The automated drywalling system of claim 7, wherein the computational planner further:
generates instructions for driving a cutting system to perform at least one cutting task that includes the cutting system cutting one or more pieces of drywall to generate cut pieces of drywall having a configuration based on the generated plan for the configuration of the plurality of drywall pieces to be disposed on studs of the target wall assembly; and
drives the cutting system to perform the at least one cutting task to generate the cut pieces of drywall having a configuration based on the generated plan for the configuration of the plurality of drywall pieces to be disposed on studs of the target wall assembly.

9. The automated drywalling system of claim 8, wherein the cutting system comprises a cutting end effector coupled to a robotic arm, the cutting end effector including a cutting head configured for cutting drywall, and wherein the instructions for driving the cutting system to perform the at least one cutting task include instructions for driving the cutting end effector and the robotic arm.

10. The automated drywalling system of claim 8, wherein the cutting system comprises a gantry assembly including a cutting end effector for cutting drywall, and wherein the instructions for driving the cutting system to perform the at least one cutting task include instructions for driving the gantry assembly.

11. The automated drywalling system of claim 7, wherein the computational planner further:
   generates instructions for driving a cutting system to perform at least one cutting task that includes the cutting system marking one or more pieces of drywall to generate markings that are used to cut the pieces of drywall to have a configuration based on the generated plan for the configuration of the plurality of drywall pieces to be disposed on studs of the target wall assembly; and
   drives the cutting system to perform the at least one cutting task to generate the markings on the pieces of drywall.

12. The automated drywalling system of claim 7,
   further comprising an elongated robotic arm that extends between a base end and a distal end, and
   a hanging end effector coupled at the distal end of the robotic arm, the hanging end effector configured to hang pieces of drywall on a wall assembly,
   wherein the computational planner further:
      generates instructions for driving the hanging end effector and robotic arm to perform at least one hanging task that includes the hanging end effector hanging cut pieces of drywall on the studs of the target wall assembly, the generation of instructions for the at least one hanging task being based on the plan for the configuration of a plurality of drywall pieces to be disposed on studs of the target wall assembly; and
      drives the hanging end effector and robotic arm to perform the at least one hanging task to hang the cut pieces of drywall on studs of the target wall assembly.

13. The automated drywalling system of claim 12, wherein the hanging end effector is configured to couple the plurality of cut pieces of drywall on the wall assembly via fasteners.

14. The automated drywalling system of claim 7,
   further comprising an elongated robotic arm that extends between a base end and a distal end, and
   a hanging end effector coupled at the distal end of the robotic arm, the hanging end effector configured to assist a user hanging pieces of drywall on a wall assembly,
   wherein the computational planner further:
      generates instructions for driving the hanging end effector and robotic arm to perform at least one hanging task that includes the hanging end effector assisting a user in hanging cut pieces of drywall on the studs of the target wall assembly, the generation of instructions for the at least one hanging task being based on the plan for the configuration of a plurality of drywall pieces to be disposed on studs of the target wall assembly; and
      drives the hanging end effector and robotic arm to perform the at least one hanging task to assist the user in hanging the cut pieces of drywall on studs of the target wall assembly.

15. The automated drywalling system of claim 1, further comprising the computational planner importing at least one of a map, BIM model, floorplan, or specification document of the target wall assembly including a mapping of the plurality of studs that define the portion of the target wall assembly, and
   wherein the generating the plan for the configuration of the plurality of drywall pieces to be disposed on studs of the target wall assembly is further based on the imported at least one of the map, BIM model, floorplan, or specification document.

16. The automated drywalling system of claim 15, wherein the at least one of the map, BIM model, floorplan, or specification document of the target wall assembly further comprises a location of wall elements including one or more of a pipe, a vent, or electrical systems, and
   wherein the generating the plan for the configuration of the plurality of drywall pieces to be disposed on studs of the target wall assembly is further based on the imported at least one of the map, BIM model, floorplan, or specification document.

17. The automated drywalling system of claim 1, wherein the generating the plan for the configuration of the plurality of drywall pieces to be disposed on studs of the target wall assembly is further based on optimizing the configuration of drywall pieces to for one or more of:
   minimizing waste drywall material created when generating the drywall pieces via cutting,
   minimizing drywall material used to generate the drywall pieces,
   minimizing the number of seams, joints or interfaces of the plurality of drywall pieces when disposed on studs of the target wall assembly, or
   minimizing the number of cuts required to generate the plurality of drywall pieces.

18. The automated drywalling system of claim 1, further comprising the computational planner driving a marking end effector to make markings on the one or more pieces of drywall, the markings labeling the one or more pieces of drywall with identifiers that reference identifiers in at least one of a map, BIM model, floorplan, or specification document.

* * * * *

UNITED STATES PATENT AND TRADEMARK OFFICE
CERTIFICATE OF CORRECTION

PATENT NO. : 10,526,799 B2
APPLICATION NO. : 15/942193
DATED : January 7, 2020
INVENTOR(S) : Maria J. Telleria et al.

It is certified that error appears in the above-identified patent and that said Letters Patent is hereby corrected as shown below:

In the Claims

Column 16, Line 13, cancel the text beginning with "1. An automated drywalling" to and ending "target wall assembly." in Column 17, Line 19 and insert the following claim:
--1. An automated drywalling system for cutting drywall and hanging drywall on a wall assembly, the automated drywalling system comprising:
    a base unit that includes:
        a platform,
        a cart configured to be disposed on and move on the ground, and
        a lift disposed between the platform and the cart, the lift configured to raise the platform up and down;
    an elongated robotic arm that extends between a base end and a distal end, the robotic arm coupled to the base unit on the platform at the base end of the robotic arm;
    a cutting end effector configured to be coupled at the distal end of the robotic arm, the cutting end effector including a cutting head configured for cutting drywall;
    a hanging end effector configured to be coupled at the distal end of the robotic arm, the hanging end effector configured to hang pieces of drywall on a wall assembly;
    one or more vision systems;
    one or more sensors;
    a computing device executing a computational planner that:
        obtains target wall assembly data from the one or more vision systems and the one or more sensors, the target wall assembly data including information regarding a configuration of a target wall assembly including a plurality of studs that, define a portion of the target wall assembly;
        automatically generates, before hanging any of a plurality of drywall pieces, a plan for a configuration of the plurality of drywall pieces to be disposed on studs of the target wall assembly based on the target wall assembly data;
        automatically generates instructions for driving the cutting end effector, the robotic arm, and the base unit to perform at least one cutting task that includes the cutting end effector cutting one or more pieces of drywall to generate cut pieces of drywall having a configuration based on the Signed and Sealed this
Sixth Day of December, 2022

Katherine Kelly Vidal
*Director of the United States Patent and Trademark Office*

CERTIFICATE OF CORRECTION (continued)
U.S. Pat. No. 10,526,799 B2 generated plan for the configuration of the plurality of drywall pieces to be disposed on the studs of the target wall assembly;

automatically drives the cutting end effector, the robotic arm, and the base unit to perform the at least one cutting task to generate the cut pieces of drywall having the configuration based on the generated plan for the configuration of the plurality of drywall pieces to be disposed on the studs of the target wall assembly;

automatically generates instructions for driving the hanging end effector, the robotic arm, and the base unit to perform at least one hanging task that includes the hanging end effector hanging the cut pieces of drywall on the studs of the target wall assembly, the generation of instructions for the at least one hanging task being based on the plan for the configuration of the plurality of drywall pieces to be disposed on the studs of the target wall assembly; and automatically drives the hanging end effector, the robotic arm, and the base unit to perform the at least one hanging task to hang the cut pieces of drywall on the studs of the target wall assembly; and a visualization system that generates a visualization projected onto the target wall assembly that provides instructions to a user and to the automated drywalling system for hanging the cut pieces of drywall on the target wall assembly, wherein the visualization system comprises at least one of a light projector system and an augmented reality system, and wherein the automated drywalling system uses said instructions for hanging the cut pieces of drywall on the target wall assembly to guide how the cut pieces of drywall are to be hung on the target wall assembly.--

Column 17, Line 20, cancel the text beginning with "2. The automated drywalling" to and ending "assembly via fasteners." in Column 17, Line 22 and insert the following claim:
--2. The automated drywalling system of claim 1, wherein the hanging end effector is configured to couple the cut pieces of drywall on the wall assembly via fasteners.--

Column 17, Line 23, cancel the text beginning with "3. An automated drywalling" to and ending "target wall assembly." in Column 17, Line 59 and insert the following claim:
--3. An automated drywalling system comprising:
  a base unit;
  an elongated robotic arm that extends between a base end and a distal end, the robotic arm coupled to the base unit at the base end of the robotic arm;
  a cutting end effector configured to be coupled at the distal end of the robotic arm, the cutting end effector including a cutting head configured for cutting drywall;
  a hanging end effector configured to be coupled at the distal end of the robotic arm, the hanging end effector configured to hang pieces of drywall on a wall assembly;
  one or more vision systems;
  a computing device executing a computational planner that:
      obtains target wall assembly data from the one or more vision systems, the target wall assembly data including information regarding a configuration of a target wall assembly including a plurality of studs that define a portion of the target wall assembly; and
      automatically generates, before hanging any of a plurality of drywall pieces, a plan for a configuration of the plurality of drywall pieces to be disposed on studs of the target wall assembly based on the target wall assembly data; and
  a visualization system that generates a visualization on the target wall assembly that illustrates instructions to at least one of a user and the automated drywalling system for hanging a plurality of cut pieces of drywall on the target wall assembly, wherein the visualization system comprises at least one of a light projector system, an augmented reality system and a user interface, and wherein the automated drywalling system uses said instructions for hanging the plurality of cut pieces of drywall on the target wall assembly to guide how the plurality of cut pieces of drywall are to be hung on the target wall assembly.--

Column 17, Line 60, cancel the text beginning with "4. The automated drywalling" to and ending "target wall assembly." in Column 18, Line 8 and insert the following claim:
--4. The automated drywalling system of claim 3, wherein the computational planner further:
    automatically generates instructions for driving the cutting end effector, the robotic arm, and the base unit to perform at least one cutting task that includes the cutting end effector cutting one or more pieces of drywall to generate the plurality of cut pieces of drywall having a configuration based on the generated plan for the configuration of the plurality of drywall pieces to be disposed on the studs of the target wall assembly; and
    automatically drives the cutting end effector and the robotic arm to perform the at least one cutting task to generate the plurality of cut pieces of drywall having a configuration based on the generated plan for the configuration of the plurality of drywall pieces to be disposed on the studs of the target wall assembly.--

Column 18, Line 9, cancel the text beginning with "5. The automated drywalling" to and ending "target wall assembly." in Column 18, Line 22 and insert the following claim:
--5. The automated drywalling system of claim 3, wherein the computational planner further:
    automatically generates instructions for driving the hanging end effector, the robotic arm, and the base unit to perform at least one hanging task that includes the hanging end effector hanging the plurality of cut pieces of drywall on the studs of the target wall assembly, the generation of instructions for the at least one hanging task being based on the generated plan for the configuration of the plurality of drywall pieces to be disposed on the studs of the target wall assembly; and
    automatically drives the hanging end effector, the robotic arm, and the base unit to perform the at least one hanging task to hang the plurality of cut pieces of drywall on the studs of the target wall assembly.--

Column 18, Line 23, cancel the text beginning with "6. The automated drywalling" to and ending "assembly via fasteners." in Column 18, Line 25 and insert the following claim:
--6. The automated drywalling system of claim 3, wherein the hanging end effector is configured to couple the plurality of cut pieces of drywall on the target wall assembly via fasteners.--

Column 18, Line 26, cancel the text beginning with "7. An automated drywalling" to and ending "target wall assembly." in Column 18, Line 48 and insert the following claim:
--7. An automated drywalling system comprising:
    one or more vision systems;
    a computing device executing a computational planner that:
        obtains target wall assembly data from the one or more vision systems, the target wall assembly data including information regarding a configuration of a target wall assembly including a plurality of studs that define a portion of the target wall assembly; and
        generates, before hanging any of a plurality of drywall pieces, a plan for a configuration of the plurality of drywall pieces to be disposed on studs of the target wall assembly based on the target wall assembly data; and an electronic visualization system that presents a visualization associated with the target wall assembly that provides instructions for hanging a plurality of cut pieces of drywall on the target wall assembly, and wherein the automated drywalling system uses said instructions for hanging the plurality of cut pieces of drywall on the target wall assembly as a guide to how the plurality of cut pieces of drywall are to be hung on the target wall assembly.--

Column 18, Line 49, cancel the text beginning with "8. The automated drywalling" to and ending "target wall assembly." in Column 18, Line 63 and insert the following claim:
--8. The automated drywalling system of claim 7, wherein the computational planner further:
    generates instructions for driving a cutting system to perform at least one cutting task that includes the cutting system cutting one or more pieces of drywall to generate the plurality of cut pieces of drywall having a configuration based on the generated plan for the configuration of the plurality of drywall pieces to be disposed on the studs of the target wall assembly; and
    drives the cutting system to perform the at least one cutting task to generate the plurality of cut pieces of drywall having a configuration based on the generated plan for the configuration of the plurality of drywall pieces to be disposed on the studs of the target wall assembly.--

Column 19, Line 9, cancel the text beginning with "11. The automated drywalling" to and ending "pieces of drywall." in Column 19, Line 21 and insert the following claim:
--11. The automated drywalling system of claim 7, wherein the computational planner further:
    generates instructions for driving a cutting system to perform at least one cutting task that includes the cutting system marking one or more pieces of drywall to generate markings that are used to cut the one or more pieces of drywall to have a configuration based on the generated plan for the configuration of the plurality of drywall pieces to be disposed on the studs of the target wall assembly; and
    drives the cutting system to perform the at least one cutting task to generate the markings on the one or more pieces of drywall.--

Column 19, Line 22, cancel the text beginning with "12. The automated drywalling" to and ending "target wall assembly." in Column 19, Line 41 and insert the following claim:
--12. The automated drywalling system of claim 7,
    further comprising an elongated robotic arm that extends between a base end and a distal end, and
    a hanging end effector coupled at the distal end of the robotic arm, the hanging end effector configured to hang pieces of drywall on a wall assembly,
    wherein the computational planner further:
        generates instructions for driving the hanging end effector and the robotic arm to perform at least one hanging task that includes the hanging end effector hanging the plurality of cut pieces of drywall on the studs of the target wall assembly, the generation of instructions for the at least one hanging task being based on the generated plan for the configuration of the plurality of drywall pieces to be disposed on the studs of the target wall assembly; and
        drives the hanging end effector and the robotic arm to perform the at least one hanging task to hang the plurality of cut pieces of drywall on the studs of the target wall assembly.--

Column 19, Line 42, cancel the text beginning with "13. The automated drywalling" to and ending "assembly via fasteners." in Column 19, Line 45 and insert the following claim:
--13. The automated drywalling system of claim 12, wherein the hanging end effector is configured to couple the plurality of cut pieces of drywall on the target wall assembly via fasteners.--

Column 19, Line 46, cancel the text beginning with "14. The automated drywalling" to and ending "target wall assembly." in Column 20, Line 10 and insert the following claim:
--14. The automated drywalling system of claim 7,
    further comprising an elongated robotic arm that extends between a base end and a distal end, and
    a hanging end effector coupled at the distal end of the robotic arm, the hanging end effector configured to assist a user hanging pieces of drywall on a wall assembly,
    wherein the computational planner further:
        generates instructions for driving the hanging end effector and the robotic arm to perform at least one hanging task that includes the hanging end effector assisting a user in hanging the plurality of cut pieces of drywall on the studs of the target wall assembly, the generation of instructions for the at least one hanging task being based on the generated plan for the configuration of the plurality of drywall pieces to be disposed on the studs of the target wall assembly; and
        drives the hanging end effector and the robotic arm to perform the at least one hanging task to assist the user in hanging the plurality of cut pieces of drywall on the studs of the target wall assembly.--

Column 20, Line 11, cancel the text beginning with "15. The automated drywalling" to and ending "or specification document." in Column 20, Line 22 and insert the following claim:
--15. The automated drywalling system of claim 1, further comprising the computational planner importing at least one of a map, BIM model, floorplan, or specification document of the target wall assembly including a mapping of the plurality of studs that define the portion of the target wall assembly, and
    wherein the generating the plan for the configuration of the plurality of drywall pieces to be disposed on the studs of the target wall assembly is further based on the imported at least one of the map, BIM model, floorplan, or specification document.--

Column 20, Line 23, cancel the text beginning with "16. The automated drywalling" to and ending "or specification document." in Column 20, Line 33 and insert the following claim:
--16. The automated drywalling system of claim 15, wherein the at least one of the map, BIM model, floorplan, or specification document of the target wall assembly further comprises a location of wall elements including one or more of a pipe, a vent, or electrical systems, and
    wherein the generating the plan for the configuration of the plurality of drywall pieces to be disposed on the studs of the target wall assembly is further based on the imported at least one of the map, BIM model, floorplan, or specification document.--

Column 20, Line 34, cancel the text beginning with "17. The automated drywalling" to and ending "of drywall pieces." in Column 20, Line 47 and insert the following claim:
--17. The automated drywalling system of claim 1, wherein the generating the plan for the configuration of the plurality of drywall pieces to be disposed on the studs of the target wall assembly is further based on optimizing the configuration of the plurality of drywall pieces for one or more of:

minimizing waste drywall material created when generating the plurality of drywall pieces via cutting, minimizing drywall material used to generate the plurality of drywall pieces, minimizing the number of seams, joints or interfaces of the plurality of drywall pieces when disposed on the studs of the target wall assembly, or minimizing the number of cuts required to generate the plurality of drywall pieces.--